US011682033B1

(12) United States Patent
Hahr et al.

(10) Patent No.: US 11,682,033 B1
(45) Date of Patent: Jun. 20, 2023

(54) MULTI-TENANT LOYALTY PROGRAM CONFIGURATION PLATFORM FOR CLOSED LOOP REWARD REDEMPTION

(71) Applicant: Hint, Inc., Pleasanton, CA (US)

(72) Inventors: Benjamin Eu-jin Hahr, Irvine, CA (US); Thomas Quinto, Poway, CA (US); Abraham Benjamin de Waal, San Jose, CA (US)

(73) Assignee: Hint, Inc., Pleasanton, CA (US)

( * ) Notice: Subject to any disclaimer, the term of this patent is extended or adjusted under 35 U.S.C. 154(b) by 0 days.

(21) Appl. No.: 17/981,036

(22) Filed: Nov. 4, 2022

(51) Int. Cl.
G06Q 30/02 (2023.01)
G06Q 30/0226 (2023.01)
G06Q 30/0207 (2023.01)

(52) U.S. Cl.
CPC ..... G06Q 30/0226 (2013.01); G06Q 30/0215 (2013.01)

(58) Field of Classification Search
CPC ................. G06Q 30/0215; G06Q 30/0226
See application file for complete search history.

(56) References Cited

U.S. PATENT DOCUMENTS 5,926,796 A * 7/1999 Walker .............. G06Q 30/0601
705/16
6,317,723 B1 * 11/2001 Walker .............. G06Q 30/0238
705/16

(Continued)

FOREIGN PATENT DOCUMENTS

WO WO-9843149 A2 * 10/1998 ............. B64G 1/007
WO WO-2015023774 A1 * 2/2015 ......... G06Q 30/0641

OTHER PUBLICATIONS

Invisible_Engines_Evans_MIT_Press_2006_pp. vii-80.*

Primary Examiner — Michael I Ezewoko
(74) Attorney, Agent, or Firm — Schwegman, Lundberg & Woessner, P.A.

(57) ABSTRACT

In some embodiments, a multi-tenant loyalty program configuration platform is provided for selective configuration of loyalty programs in a multi-tenant environment. An example platform comprises a processor and a memory storing instructions which, when executed by the processor, configure the multi-tenant loyalty program configuration platform to cause presentation, in a user interface, of loyalty program options to a first tenant in the multi-tenant environment, the user interface allowing the first tenant and the multi-tenant loyalty program configuration platform to collaborate in a program configuration flow on selected program options made by the first tenant; receive, via the user interface, from the first tenant, first order data relating to a selected program configuration, specific to the first tenant, of a first loyalty program to be implemented using the first order data, the first order data including a first set of attributes relating to the first loyalty program; cause presentation, in the user interface, of loyalty program options to a second tenant in the multi-tenant environment, the user interface allowing the second tenant and the multi-tenant loyalty program configuration platform to collaborate in a program configuration flow on selected program options made by the second tenant; receive, via the user interface, from the second tenant, second order data, different from the first order data, relating to a selected program configuration, specific to the second tenant, of a second loyalty program to be implemented using the second order data, the second order data including a second set of attributes relating to the second loyalty program; store the first and second order data in a loyalty program data structure that includes loyalty program rules specific to each of the first and second tenants and the respective first and second loyalty programs; configure the first and second loyalty programs using data stored in the loyalty program data structure; and implement the (Continued)

configured first and second loyalty programs at the multi-tenant loyalty program configuration platform.

16 Claims, 16 Drawing Sheets

(56) References Cited

U.S. PATENT DOCUMENTS

| | | | | |
|---|---|---|---|---|
| 6,334,112 | B1* | 12/2001 | Walker | G06Q 30/0224 705/16 |
| 7,184,970 | B1* | 2/2007 | Squillante | G06Q 30/02 705/14.27 |
| 7,596,797 | B1* | 9/2009 | Kapner, III | H04N 21/4532 725/50 |
| 7,631,331 | B2* | 12/2009 | Sie | H04N 21/47208 725/50 |
| 8,533,037 | B2 | 9/2013 | Postrel | |
| 8,799,977 | B1* | 8/2014 | Kapner, III | H04N 21/23113 709/212 |
| 9,094,728 | B1* | 7/2015 | Hefner | H04N 21/472 |
| 9,578,081 | B2* | 2/2017 | Watte | H04L 51/04 |
| 9,703,815 | B2* | 7/2017 | Goldbrenner | G06F 16/22 |
| 9,747,388 | B2* | 8/2017 | Micucci | G06F 16/90 |
| 9,892,177 | B2* | 2/2018 | Maquaire | G06F 16/23 |
| 9,990,426 | B2* | 6/2018 | Micucci | G06F 16/95 |
| 10,185,486 | B2* | 1/2019 | Lewis | G06F 3/04847 |
| 10,346,869 | B1* | 7/2019 | Ahmed | G06Q 30/0226 |
| 10,354,239 | B1* | 7/2019 | Nguyen | G06Q 20/102 |
| 10,482,462 | B1* | 11/2019 | Eidam | G06F 3/0482 |
| 10,606,860 | B2* | 3/2020 | Maquaire | G06F 16/23 |
| 10,628,865 | B2* | 4/2020 | Bermudez | G06Q 30/0226 |
| 10,776,425 | B2* | 9/2020 | Micucci | H04L 63/08 |
| 10,832,307 | B1* | 11/2020 | Reyelts | G06Q 10/087 |
| 10,963,971 | B1* | 3/2021 | Greene | H04L 63/10 |
| 10,984,434 | B1* | 4/2021 | Arya | G06Q 20/22 |
| 11,062,293 | B2* | 7/2021 | Phelps | G06Q 20/145 |
| 11,126,985 | B1* | 9/2021 | Reyelts | G06Q 20/201 |
| 11,138,646 | B2* | 10/2021 | Bermudez | G06Q 20/0855 |
| 11,250,055 | B2* | 2/2022 | Micucci | H04L 63/08 |
| 11,334,904 | B1* | 5/2022 | Ahmed | G06Q 30/0226 |
| 11,386,445 | B1* | 7/2022 | Arya | G06Q 30/0215 |
| 11,418,490 | B2* | 8/2022 | Shribman | H04L 63/0272 |
| 2002/0046121 | A1* | 4/2002 | Walker | G07G 1/12 705/16 |
| 2007/0271114 | A1* | 11/2007 | Walker | G07G 1/0036 705/16 |
| 2008/0270240 | A1* | 10/2008 | Chu | G06Q 30/0239 434/350 |
| 2012/0123835 | A1* | 5/2012 | Chu | G06Q 30/0239 705/14.12 |
| 2013/0024281 | A1* | 1/2013 | Walker | G06Q 30/00 705/14.51 |
| 2013/0311293 | A1* | 11/2013 | Ward | G06Q 30/0267 705/14.61 |
| 2014/0230076 | A1* | 8/2014 | Micucci | H04L 63/08 726/28 |
| 2015/0161583 | A1* | 6/2015 | Phelps | G06Q 20/145 705/35 |
| 2017/0046790 | A1* | 2/2017 | Axe | G06Q 40/12 |
| 2017/0149715 | A1* | 5/2017 | Watte | H04L 67/01 |
| 2018/0047073 | A1* | 2/2018 | Neumark | G06Q 30/04 |
| 2019/0362326 | A1* | 11/2019 | Nguyen | G06Q 30/0641 |
| 2020/0034813 | A1* | 1/2020 | Calinog | G06Q 20/065 |
| 2020/0074520 | A1* | 3/2020 | Bermudez | H04L 67/53 |
| 2020/0226655 | A1* | 7/2020 | Bermudez | G06Q 20/0855 |
| 2022/0005096 | A1* | 1/2022 | Bermudez | G06Q 20/14 |

* cited by examiner

Rules Matrix

| Rule | Configurable Values | Reference Data | Description | Restrictions | Example |
|---|---|---|---|---|---|
| Earn by amount spent | • Dollar Amount<br>• Stamp threshold | • Stamp count<br>• Timeframe | A transaction over a certain dollar amount earns a stamp | Multiples of the minimum threshold do not qualify for more stamps (ie, if the minimum is $500, $800 still only earns 1 stamp) | A practice sets a minimum earning amount to be $500. When a patient spends >$500, they earn 1 stamp. |
| Earn by product | • Product/service<br>• Unit minimum<br>• Stamp threshold | • Stamp count<br>• Timeframe | A transaction including a certain product earns a stamp | If a practice chooses more than 1 product, a patient must purchase all products in order to earn a stamp (ie, it's an AND situation), a practice is also able to set a minimum number of units | Example 1: A practice sets 50 units of Botox as the earning product. When a patient comes in and receives >50 units of Botox, they receive a stamp. Example 2: A practice sets 50 units of Botox and 1 syringe of Juvederm as the earning criteria. A patient comes in and receives 50 units of Botox and nothing else; they do NOT receive a stamp. |
| Earn by category | • Category<br>• Unit minimum (separate values if different units of measure)<br>• Stamp Threshold | • Stamp count<br>• Timeframe | A transaction including any product within a category earns a stamp | Category earning are an "OR" situation. A patient can receive any product within a category and receive a stamp for that purchase. They do not need to purchase multiple or all of the products/services within a category | A practice sets "neurotoxins" as the earning category (neurotoxins includes Botox, Dysport, Jeuveau, Xeomin, Daxi). A patient comes in and receives Dysport and earns a stamp. In 3 months, the patient receives Botox and earns a stamp. |

FIG. 8

Parameter Definitions

| Parameter | Description | Example |
|---|---|---|
| Timeframe | Time range in which a patient is eligible to earn a stamp or redeem a reward. Timeframe is rolling from stamp earning. | Evergreen program: A practice sets 4 stamps per year. A patient must receive 4 stamps within Jan 1, 2020 and Jan 2021 in order to receive a reward on their 4th visit.<br><br>Campaign: A practice sets a program in which a patient needs to purchase Botox within the next 3 months to receive 10% off their purchase. This is a 1-stamp (or 1 visit) situation where a patient can redeem the reward on the first earning event. Ie, the program is launched on Jan 1, 2021 and a patient receives BTX on Feb 1 - they get 10% off. If a patient receives BTX on Jun 1, they do not receive a reward.<br><br>Time range is rolling based on stamp earning. Here's an example:<br><br>4 stamps in 1 year to achieve reward<br><br>Jan 1: Patient earns stamp<br>Mar 1: Patient earns stamp<br>Jun 1: Patient earns stamp<br><br>Feb 1: Patient earns stamp, they are on their 3rd stamp; looking back 1 year, they have earned 3 stamps (Mar, Jun, Feb) |
| Stamp Count | The fundamental unit of measure (or currency) for Automatic Rewards. # of stamps dictates when a patient is eligible for a reward | A practice sets any purchase of Botox receives a stamp, and a patient can receive a reward of 10% off their purchase after 2 stamps. On the second purchase of Botox, a patient will receive 10% off. |

FIG. 9

Reward Definitions

*If a practice sets more than one reward, those rewards will be available for a patient to choose from upon eligibility. A patient can choose ONLY ONE reward upon each redemption event.

| Reward | Description | Configurable Values | Redemption Rules | Example |
|---|---|---|---|---|
| Discount Reward | A reward that provides a discount off a patient's purchase. Note: Discount Amount instead of % for MVP | • Percentage discount<br>• Maximum dollar amount off<br>• Products excluded<br>• Category excluded | Discounts are redeemed immediately. If a patient chooses the discount, it is applied to the same purchase that is currently being transacted (i.e. if a practice requires n stamps for a reward, this is on the nth earning event). If a practice chooses to override or remove the reward, we do not track this anywhere in the loyalty system (for 1st iteration of Automatic Rewards). | A practice sets a 10% discount as a reward, with a maximum of $500 off any purchase. They choose to exclude the category called "Sculptra". A patient comes in and purchases $10,000 worth of Sculptra. They have earned their nth stamp and are eligible for a reward. They choose 10% off their purchase. They receive $500 off and their total that day is $9,500. |
| Product Reward | A free ("complimentary") product/service as a reward | • Product/service<br>• Maximum units | Products/services can be redeemed immediately, or deferred. If a patient selects a free product, the practice will designate via OPUL whether the patient redeemed that treatment during that visit or not. If they did, the product is immediately taken into the cart as $0. If the patient did not receive it, it will enter the patient's wallet as service credit, with the value of the current price of that product. | A practice sets 1 free Hydrafacial treatment as a reward. A patient comes in and purchases a purchase that earns their nth stamp. They choose the free Hydrafacial. They were not previously aware of this award, so they did not receive the Hydrafacial today and would like to receive it on a future visit. The practice designates the patient did not receive treatment today and the Hydrafacial is deferred. The price the practice has set for a Hydrafacial is $150. $150 goes into the patient's wallet as service credit for a Hydrafacial, so the patient can use toward treatment at a later date. |

MULTI-TENANT LOYALTY PROGRAM CONFIGURATION PLATFORM FOR CLOSED LOOP REWARD REDEMPTION

BACKGROUND

User interfaces and data structures pertaining to the creation and management of loyalty programs (e.g., for goods or services such as medical treatments), while having advanced in recent years, have not been optimized for use in a cross number of verticals and also for the management of more complicated subscription arrangements between providers and customers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 is a table diagram illustrating a rules matrix, according to some example embodiments.

FIG. 9 is a table diagram illustrating further details of parameters, according to some example embodiments.

FIG. 10 is a table diagram illustrating further details of loyalty rewards, according to some example embodiments.

DETAILED DESCRIPTION

Figure 1:
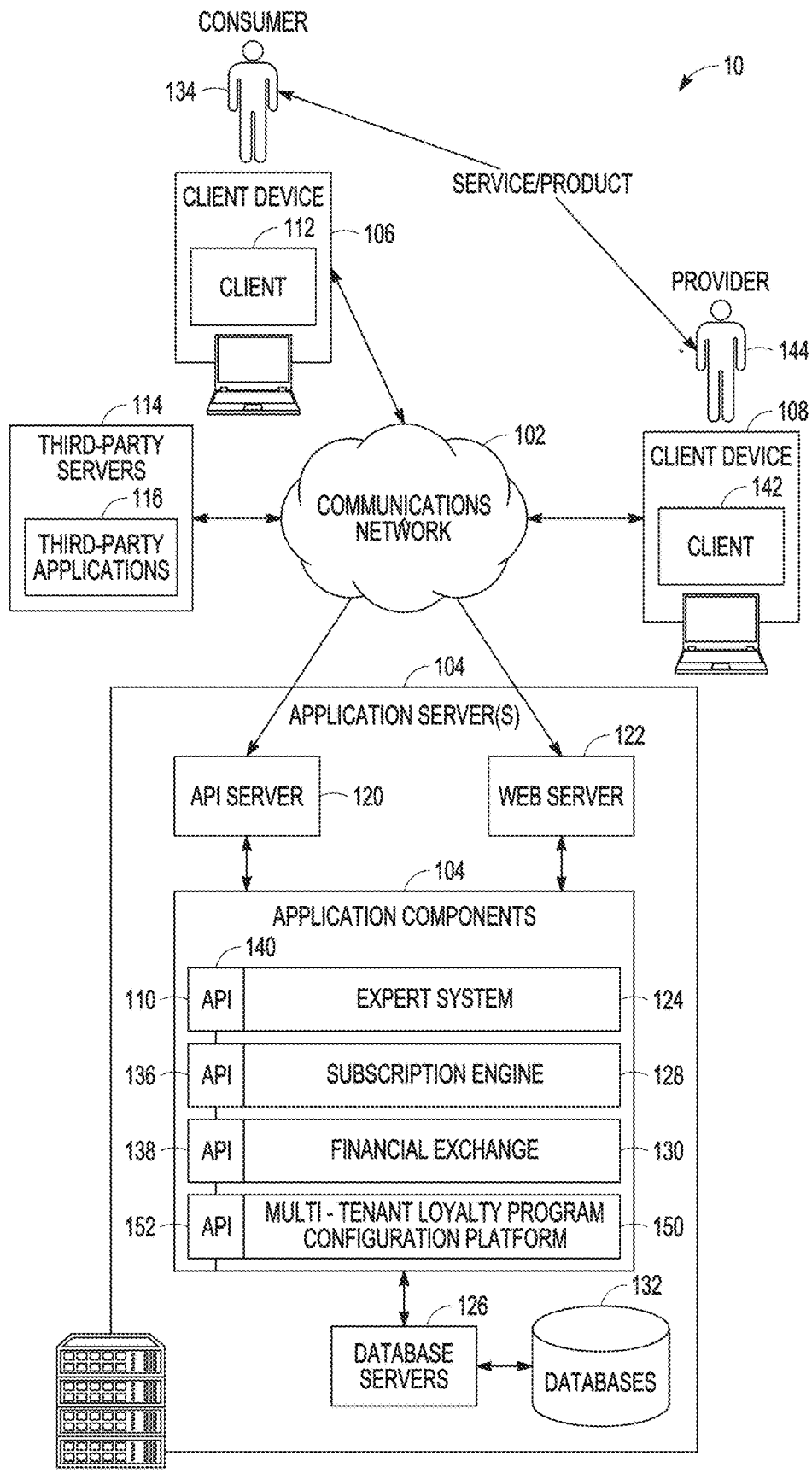
FIG. 1 illustrates a networked environment in which the described technology, according to some example embodiments, may be deployed.

According to some example embodiments, there is provided multi-tenant loyalty program configuration platform for closed loop reward redemption. Some examples include a multi-tenant loyalty configuration program platform for selective configuration of loyalty programs in a multi-tenant environment. Some examples include a loyalty program management system that generates and uses data structures and interfaces that allow for configurability and flexibility in the creation of a bundle of subscriptions, for a specific user, to one or more loyalty programs and rewards which may be delivered and redeemed in terms of one or more plans and account configurations.

Creating, configuring, and managing a loyalty program in a multi-tenant subscription environment can be difficult and present several technical challenges. This is particularly so where product or service offerings as being subjects of a reward program managed by the loyalty program configuration platform are part of a bundle of offerings or services offered by a multitude of different tenants. Each tenant may wish to create a different or unique loyalty program within a given plan, for example. Because this area of software and technology is frequently used in a check out flow on a touchscreen tablet device while a customer is watching, now there is a need to have a fast, friction-free methods to enter and process data.

In some examples, a tenant includes a medical practice or service provider, for example offering aesthetic treatments to patients. Some examples provide enhanced technology to repurpose a conventional open-loop discount liability that practices offer patients today into a closed-loop program that seeks to provide increased patient retention without incurring further practice liability.

In some examples, business problems faced by a tenant, such as a medical practice, include inherent technical problems, for example an inability to make insightful data or feature attribution. In other words, trying to identify what specific output (for example, increased patient or new referral) was caused by what specific input (for example, what type of reward or incentive was offered to drive this behavior). Current loyalty program systems can be very unsophisticated, non-intuitive, or unhelpful in this regard, especially in a multi-tenant, multi-factor environment of the modern day.

In conventional open loop systems, practices often offer discounts to patients based on particular products and services or combinations of products and services. Some practices offer manufacturer- or brand-backed discounts. Manufacturers often have coupons or promotions running that add additional pass-through discounts to patients. Some practices offer manufacturer or brand loyalty programs. Most manufacturers also have some kind of accruing rewards program where patients can redeem points to achieve coupons that provide even more discounts on products or services. Some practices include stacked discounts.

However, when a discount is given by one of the above open loop methods, one of two things can happen. the patient's total cost of treatment is reduced and the patient leaves with that saved money in their pocket or wallet with the practice's margin on that transaction is decreased by the discount, or the practice temporarily holds a liability until the manufacturer reimburses the discount that they provided. In either case, the practice offered a given discount liability, and that amount is most typically lost when the patient checks out and leaves. Additionally, from a technical point of view, the success of each of these program's effectiveness at driving patient retention, new referrals, rapport, and so forth is often technically very difficult to quantify and attribute for the practice. Some examples address and seek to provide technical solutions for these technical difficulties.

Some present examples aggregate data to create a stored body of reward data for use in multi-tenant closed loop reward redemption systems, discussed further below. The aggregated data may include data sourced from sources other than a single tenant (in other words, an aggregation of multi-tenant or multi-party data). For testing purposes, data analysis, or machine training purposes, an enhanced body of reward data may be useful to a tenant or third-party data analyzer even though not all of the aggregated data may have been sourced from it. In this situation, a complicated cross-matrix of protection protocols such a Personally Identifiable Information (PII), Protected Health Information (PHI), and Payment Card Industry (PCI) may apply, and each tenant may be entitled only to view the portion of the data that it supplied.

Some examples of a multi-tenant loyalty program configuration program (for example, an OPUL platform from Revance™) enable practices (as tenants in a multi-tenant environment) to offer a new kind of benefit to their patients (also referred to as users herein), an aesthetic savings account (ASA). In some examples, an ASA is a savings vehicle that is loyalty advantaged by participation from the practice, and/or brands and manufacturers. An ASA may have a current balance expressed as a value, such a practice-specific currency or points. A practice can configure their ASA terms to specify reward rules including for example earning criteria, benefits, and minimum or maximum spending amounts for matching amounts. For example: Amazing Aesthetics will match 5 cents on every dollar you put into your ASA up to maximum benefit of $1000 per year. Patients can choose either to contribute in larger amounts to their ASA or in smaller monthly increments, but nevertheless remain eligible for the practice's "investment" or amplification of their funds.

Some examples include a closed loop redemption of rewards. Upon returning to use ASA funds or points, patients will have a clear understanding of their contributions and their matched contributions from their practice. Given that the funds or points can only be used at the practice, the patient will typically be more receptive to spending their available balance.

Some examples promote brand participation and subsidy. Brands and manufacturers can further amplify the ASA experience by offering further subsidized benefit based on what patients choose to spend their ASA balance on. For example, a brand could offer a patient an additional 10% match in their ASA balance if they choose to go with Botox. This can provide a powerful tool for brands to drive conversion through the OPUL platform, while practices receive the direct credit for offering the ASA benefit to begin with.

Some examples drive certain behavior. For example, a practice may have designated a discount liability for each patient per year, but here the patients perceives these funds to be "free money" as opposed to "saved money." In present examples, the rewarded funds are kept within a closed loop that can only be spent at the practice. The patient is incented to utilize their earned value at each visit, versus taking it home as an unused "freebie" within their pocket or electronic wallet.

Some examples seek to provided increased value to patients. Research has shown that to many patients, affordability is the main detracting consideration when it comes to seeking aesthetic treatments or pursuit of aesthetic correction. By attributing value at each chain link from patient to provider to practice to brand, present examples can align a number of incentives that amplify the patient's dollar effectively increasing the affordability of these treatments.

Some examples seek to provide an increased value to a practice. For example, providing both practices and brands the ability to subsidize, boost, or "invest" in their patients, present examples seek to improve most major value areas, or key performance indicators (KPIs), that practices seek to monitor such as patient loyalty, consistency, frequency, spend, and willingness to try new products. All of these and other KPIs can be monitored in present examples with attribution data generated linking the effect of specific rewards on a given KPI. Moreover, unlike conventional discounts and promotions, the promised value back to the patient does not leak from my business when they leave, it is already in the closed loop system within a given tenant business.

Some examples seek to be a technology partner to aesthetic practices helping them build stronger relationships with their patients and grow. Examples seek to do this by building value that enables practices to build unique experiences for their patients creating increased loyalty between patient and practice, not patient and brand (necessarily). This functionality can help to drive financial commitment and patient loyalty.

Some examples seek to provide value to brands. Today, brands use a combination of discount promotions, reimbursement rewards programs, and live in-person events to drive action amongst consumers through their practice partners. Most of these efforts require generic amounts of budget with generic attribution of value because the brand cannot control the experience at the actual practice. Some present examples enable brands to confidently subsidize and spend promotional dollars on patients who are willing to commit and be loyal to these treatments. This value is conveyed to a brand using improved technology including digestible structured data so that clear results can be drawn on returns on investment. The improved technology can enable decisions to be made at scale.

In some embodiments, a multi-tenant loyalty program configuration platform is provided for selective configuration of loyalty programs in a multi-tenant environment. In some examples, the platform comprises a processor; and a memory storing instructions which, when executed by the processor, configure the multi-tenant loyalty program configuration platform to: cause presentation, in a first user interface, of loyalty program options to a first tenant in the multi-tenant environment, the first user interface allowing the first tenant and the multi-tenant loyalty program configuration platform to collaborate in a program configuration flow on selected program options made by the first tenant; receive, via the first user interface, from the first tenant, first order data relating to a selected program configuration, specific to the first tenant, of a first loyalty program to be implemented using the first order data, the first order data including a first set of attributes relating to the first loyalty program; create a first reward savings account, specific to a first subscribed user at the first tenant, for storing a current value of a first reward balance available to the first subscribed user in the first loyalty program; cause presentation, in a second user interface, of loyalty program options to a second tenant in the multi-tenant environment, the second user interface allowing the second tenant and the multi-tenant loyalty program configuration platform to collaborate in a program configuration flow on selected program options made by the second tenant; receive, via the second user interface, from the second tenant, second order data, different from the first order data, relating to a selected program configuration, specific to the second tenant, of a second loyalty program to be implemented using the second order data, the second order data including a second set of attributes relating to the second loyalty program; create a second reward savings account, specific to a second subscribed user at the second tenant, for storing a current value of a second reward balance available to the second subscribed user in the second loyalty program; store the first and second order data in a loyalty program data structure that includes loyalty program rules specific to each of the first and second tenants and the respective first and second loyalty programs, and respective current values of the first and second reward balances of the respective first and second rewards savings accounts; configure the first and second loyalty programs using data stored in the loyalty program data structure; implement the configured first and second loyalty programs; and display or access the respective current values of the first and second reward balances upon demand or during a transaction by the first and second subscribed users in the first and second loyalty programs.

In some examples, the processor is further configured to: convert a configured reward in the first or second loyalty program into a reward currency or points, the reward currency or points being specific to the first or second tenant; and in response to an earned, redeemed, or issued reward, adjust a current value of a first or second reward balance based on a converted reward currency.

In some examples, an earned or issued reward is redeemable only at the first or second tenant issuing the configured reward, or at which the configured reward was earned.

In some examples, the processor is further configured to: adjust a current value of a first or second reward balance based on a value of a redeemed reward.

In some examples, the earned or issued reward is issued by the first or second tenant.

In some examples, the earned or issued reward is issued by a third party, the third party including a manufacturer of a branded product or provider of a branded service.

In some examples, the processor is further configured to: generate attribution data, the attribution data including an effect of an earned or issued reward on a key performance indicator of the first or second tenant.

In some examples, the processor is further configured to: calculate an output of the implemented first or second loyalty program based on a user input during a checkout flow at the first or second tenant; and cause presentation of the output as part of a checkout flow specific to the first tenant or the second tenant.

In some examples, the output is rendered and presented as a reward for a purchase of a specific good or service offered by the respective first or second tenant.

In some examples, the processor is further configured to: calculate a first output of the implemented first or second loyalty program; calculate a second output of the implemented first or second loyalty program; express the first and second outputs as respective first and second values based on a common reward currency or points applied to the implemented first or second loyalty program; compare the first and second values; and cause presentation to the first or second tenant of a result based on the compared first and second values.

In some examples, the processor is further configured to reconfigure the first or second loyalty program based on the result.

In some examples, the first and second loyalty programs are configured asynchronously by the multi-tenant loyalty program platform, the asynchronous configuration based on receipt of the first and second order data at different times.

In some examples, the first and second tenants in the multi-tenant environment each offer respective goods or services using a commercial platform separate from the multi-tenant loyalty program configuration platform, and wherein a technical configuration or implementation of the commercial platform of the first tenant is different than a technical configuration or implementation of the commercial platform of the second tenant.

In some examples, the processor is further configured to: cause presentation, in a third user interface, of loyalty program options to a third tenant in the multi-tenant environment, the user interface allowing the third tenant and the multi-tenant loyalty program configuration platform to collaborate in a program configuration flow on selected program options made by the third tenant; receive, via the third user interface, from the third tenant, third order data relating to a selected program configuration, specific to the third tenant, of a third loyalty program to be implemented using the third order data, the third order data including a third set of attributes relating to the third loyalty program; store the third order data in the loyalty program data structure that includes loyalty program rules specific to each of the third tenant and the third loyalty program; create a third reward savings account, specific to a third subscribed user at the first tenant, for storing a current value of a third reward balance available to the third subscribed user in the third loyalty program; configure the third loyalty program using data stored in the loyalty program data structure; implement the configured third loyalty program; and display or access a current value of the third reward balance upon demand or during a transaction by the third subscribed user in the third loyalty program.

In some examples, a method of configuring a loyalty program in a multi-tenant environment is provided. An example method comprises causing presentation, in a first user interface, of loyalty program options to a first tenant in the multi-tenant environment, the user interface allowing the first tenant and a multi-tenant loyalty program configuration platform to collaborate in a program configuration flow on selected program options made by the first tenant; receiving, via the first user interface, from the first tenant, first order data relating to a selected program configuration, specific to the first tenant, of a first loyalty program to be implemented using the first order data, the first order data including a first set of attributes relating to the first loyalty program; creating a first reward savings account, specific to a first subscribed user at the first tenant, for storing a current value of a first reward balance available to the first subscribed user in the first loyalty program; causing presentation, in a second user interface, of loyalty program options to a second tenant in the multi-tenant environment, the user interface allowing the second tenant and the multi-tenant loyalty program configuration platform to collaborate in a program configuration flow on selected program options made by the second tenant; receiving, via the second user interface, from the second tenant, second order data, different from the first order data, relating to a selected program configuration, specific to the second tenant, of a second loyalty program to be implemented using the second order data, the second order data including a second set of attributes relating to the second loyalty program; creating a second reward savings account, specific to a second subscribed user at the second tenant, for storing a current value of a second reward balance available to the second subscribed user in the second loyalty program; storing the first and second order data in a loyalty program data structure that includes loyalty program rules specific to each of the first and second tenants and the respective first and second loyalty programs, and respective current values of the first and second reward balances of the respective first and second rewards savings accounts; configuring the first and second loyalty programs using data stored in the loyalty program data structure; implementing the configured first and second loyalty programs; and displaying or accessing the respective current values of the first and second reward balances upon demand or during a transaction by the first and second subscribed users in the first and second loyalty programs.

In some examples, the method further comprises converting a configured reward in the first or second loyalty program into a reward currency or points, the reward currency or points being specific to the first or second tenant; and in response to an earned, redeemed, or issued reward, adjusting a current value of a first or second reward balance based on a converted reward currency.

In some examples, an earned or issued reward is redeemable only at the first or second tenant issuing the configured reward, or at which the configured reward was earned.

In some examples, the method further comprises adjusting a current value of a first or second reward balance based on a value of a redeemed reward.

In some examples, a non-transitory computer-readable storage medium is provided. An example computer-readable storage medium includes instructions that when executed by a computer, cause the computer to perform operations including: causing presentation, in a first user interface, of loyalty program options to a first tenant in a multi-tenant environment, the user interface allowing the first tenant and a multi-tenant loyalty program configuration platform to collaborate in a program configuration flow on selected program options made by the first tenant; receiving, via the first user interface, from the first tenant, first order data relating to a selected program configuration, specific to the first tenant, of a first loyalty program to be implemented using the first order data, the first order data including a first set of attributes relating to the first loyalty program; creating a first reward savings account, specific to a first subscribed user at the first tenant, for storing a current value of a first reward balance available to the first subscribed user in the first loyalty program; causing presentation, in a second user interface, of loyalty program options to a second tenant in the multi-tenant environment, the user interface allowing the second tenant and the multi-tenant loyalty program configuration platform to collaborate in a program configuration flow on selected program options made by the second tenant; receiving, via the second user interface, from the second tenant, second order data, different from the first order data, relating to a selected program configuration, specific to the second tenant, of a second loyalty program to be implemented using the second order data, the second order data including a second set of attributes relating to the second loyalty program; creating a second reward savings account, specific to a second subscribed user at the second tenant, for storing a current value of a second reward balance available to the second subscribed user in the second loyalty program; storing the first and second order data in a loyalty program data structure that includes loyalty program rules specific to each of the first and second tenants and the respective first and second loyalty programs, and respective current values of the first and second reward balances of the respective first and second rewards savings accounts; configuring the first and second loyalty programs using data stored in the loyalty program data structure; implementing the configured first and second loyalty programs; and displaying or accessing the respective current values of the first and second reward balances upon demand or during a transaction by the first and second subscribed users in the first and second loyalty programs.

In some examples, the operations further comprise converting a configured reward in the first or second loyalty program into a reward currency or points, the reward currency or points being specific to the first or second tenant; and in response to an earned, redeemed, or issued reward, adjusting a current value of a first or second reward balance based on a converted reward currency.

FIG. 1 illustrates a networked environment 100 in which a communications network 102 communicatively couples application servers 104, a client device 106, a client device 108, and third-party servers 114. The client device 106 is accessed by a consumer 134 and hosts a client 112 (e.g., a browser application). Similarly, the client device 108 is accessed and operated by a provider 144 and hosts a client 142. The third-party servers 114 host third-party applications 116.

The application servers 104 include an API server 120 and a web server 122 which, in turn, facilitate access to several application components 118 that include an expert system 124, a subscription engine 128, a financial exchange 130, and a multi-tenant loyalty program configuration platform 150. Each of these components is provided with a respective API, namely an API 110, an API 136, an API 138, and an API 152.

The application components 118 are communicatively coupled to database servers 126 which in turn facilitate access to databases 132. Further details regarding the operation of the infrastructure are provided with reference to subsequent figures.

As will be further described herein, a provider 144 (for example, a aesthetic medical practice) may wish to provide offerings (e.g., products or services) to a consumer 134 (for example, a patient), either as a once-off/one-time delivery or as part of a plan which has a recurrence. For example, the provider 144 may wish to deliver a product (e.g., face cream) to the consumer 134 on a monthly basis or may wish to provide cosmetic services to the consumer 134 on a weekly, monthly, quarterly, or annual basis. Regardless of whether the delivery of the product or service is a one-time delivery or a recurring delivery, the provider 144 may also wish to provide the consumer 134 with the option of paying for the delivery or provision as a once-off payment, as a subscription payment or as a combination of a once-off payment and a subscription payment.

At a high level, the expert system 124 operates to enable an expert in a particular vertical (e.g., the provider 144) to define and manage a plan for the delivery of various products and services to the consumer 134. An expert system 124 is accordingly specifically constructed and programmed for the creation of a plan for the delivery of a specific product or service in a particular product or service vertical.

The subscription engine 128 is responsible for the automated management of a plan (which may or may not include any number of subscriptions to products or services).

The financial exchange 130 is responsible for communicating financing opportunities related to a plan to one or more financiers (e.g., who may operate as a provider 144, or who may be a third party accessing the financial exchange 130 via the third-party applications 116).

The multi-tenant loyalty program configuration platform 150 is responsible for creating, configuring, and managing customizable loyalty programs and transactions relating thereto in a multi-tenant environment. In some examples, a reward is processed in real-time for a respective transaction.

Figure 2:
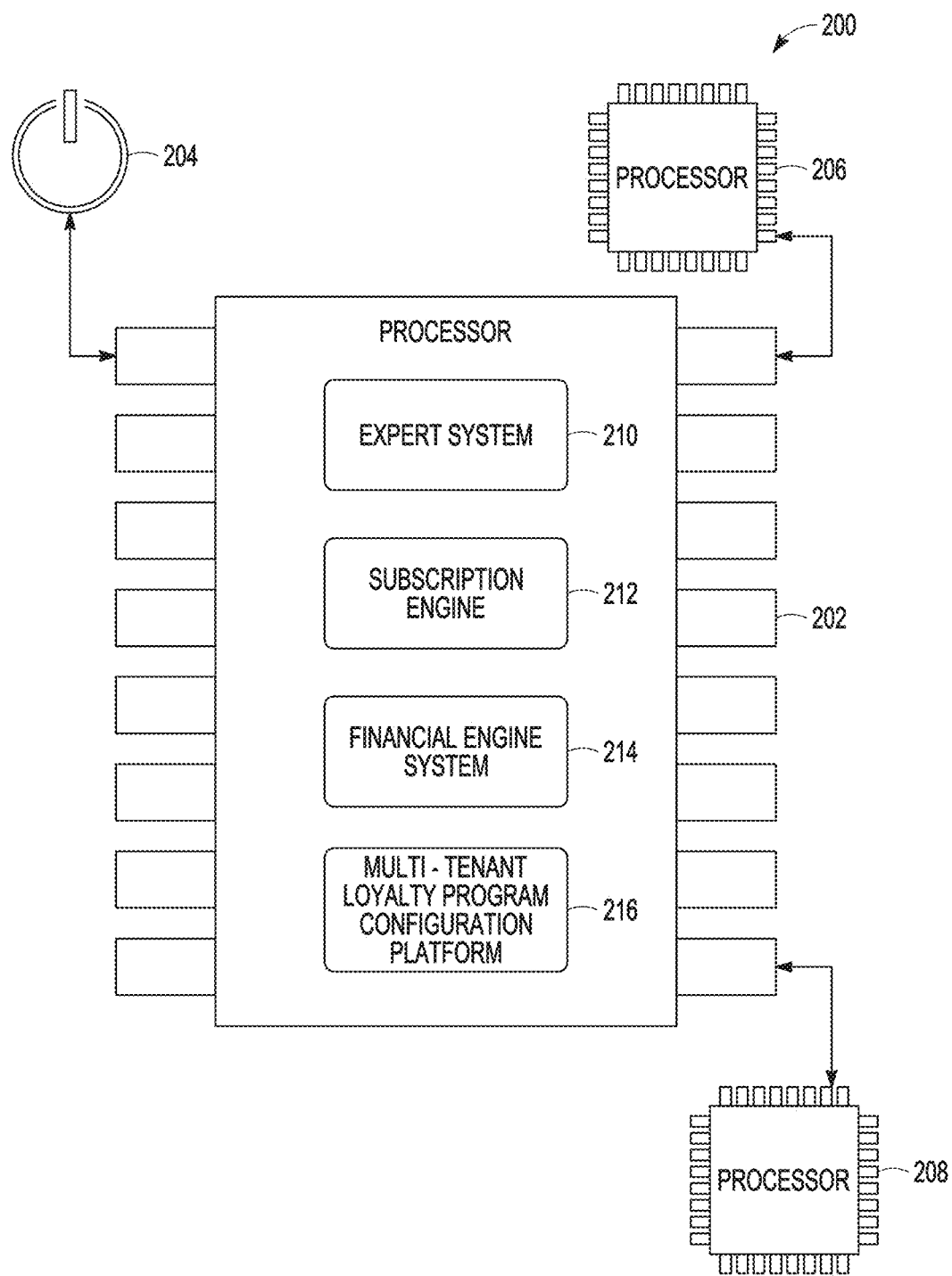
FIG. 2 is a diagrammatic representation of a processing environment, in accordance with one embodiment.

Turning now to FIG. 2, there is shown a diagrammatic representation of a processing environment 200, which includes a processor 206, a processor 208, and a processor 202 (e.g., a GPU, CPU, or combination thereof).

The processor 202 is shown to be coupled to a power source 204, and to include (either permanently configured or temporarily instantiated) modules, namely an expert system 210, a subscription engine 212, a financial exchange system 214, and a multi-tenant loyalty program configuration platform 216. The expert system 210 operationally supports a guided process for the selection of products or services, as well as the attributes of such products and services (e.g., quantity (units), a frequency of delivery and number of deliveries) to include in a subscription.

The subscription engine 212 operationally calculates and presents information relating overall options related to a subscription for bundled purchase, and the financial exchange system 214 operationally allows third parties (e.g., lenders) to view financing opportunities and accept or reject such financing opportunities for subscriptions (or bundles of subscriptions) generated by the subscription engine 212.

The multi-tenant loyalty program configuration platform 216 operationally supports the creation, configuring, and management of customizable loyalty programs and transactions relating thereto in a multi-tenant environment. As described further below, the platform 216 includes a rules engine where loyalty rules and their corresponding actions are defined, and through which transactions are processed and executed. The rules engine includes comprehensive rule and reward logic for all loyalty programs in a multi-tenant environment. The rules engine operates as a processing module in which the input is the payment, and the output is a reward (or no reward).

As illustrated, the processor 202 is communicatively coupled to both the processor 206 and processor 208 and receives data from the processor 206, as well as data from the processor 208. Each of the processor 202, processor 206 and processor 208 may host one or more of an expert system 210, a subscription engine 212, a financial exchange system 214, and a multi-tenant loyalty program configuration platform 216.

Figure 3:
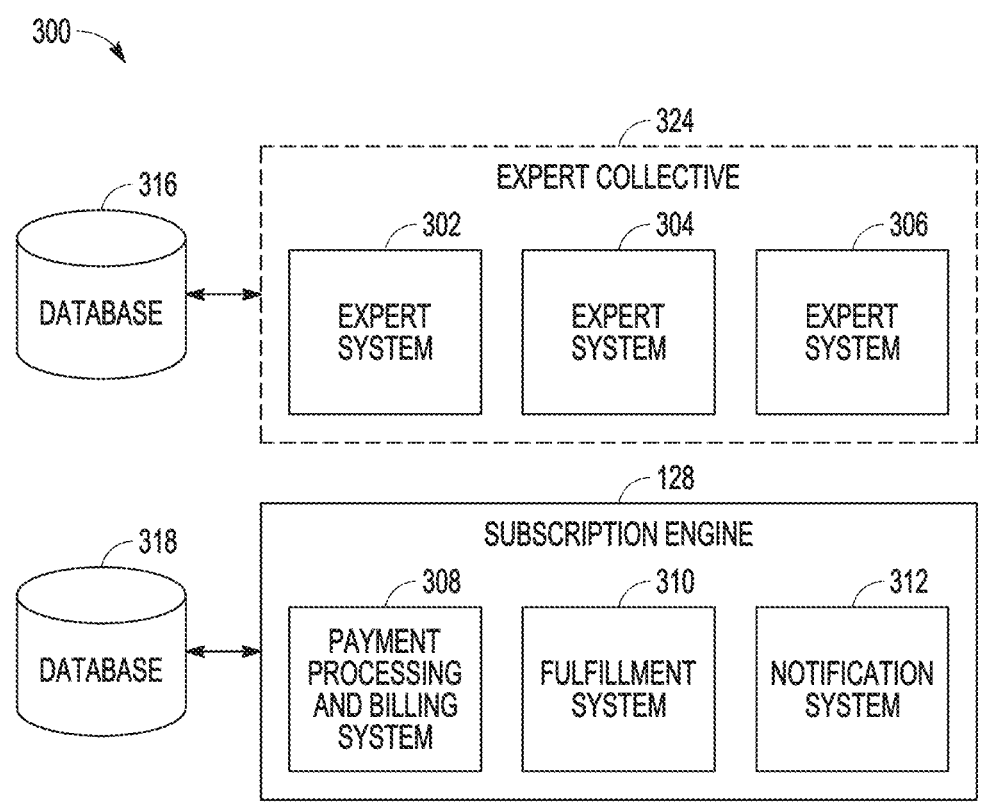
FIG. 3 illustrates further details regarding the subcomponents of a subscription engine, according to some example embodiments.

FIG. 3 illustrates the various sub-components of a subscription engine 128, namely a payment processing and billing system 308, a fulfillment system 310, and a notification system 312. The payment processing and billing system 308 is operationally responsible for the processing of payments and issuing of invoices/bills. The fulfillment system 310 communicates with third parties for the shipping of goods, when appropriate, as well as with service providers to record the delivery of goods and services to a customer. The notification system 312 operationally provides notifications to both customers and service providers regarding upcoming fulfillment events, as well as other delivery-related events.

The subscription engine 128 is also communicatively coupled to a database 318, to both store and retrieve data needed by each of the payment processing and billing system 308, the fulfillment system 310 and the notification system 312. The fulfillment system 310 creates and tracks the fulfillment or delivery of a service or a product. For example, for a service, the fulfillment system 310 records what was rendered or provided (e.g., what, how much, when, value) and uses the notification system 312 to remind users of appointments for a follow-up service. For products, the fulfillment system 310 issues orders, tracks shipping and delivery, in addition to tracking what was rendered and provided.

The notification system 312 is a messaging system that uses different media or messaging channels (e.g., email, text, push notification, etc.) to alert customers, providers (e.g., practices) and operations of different events.

FIG. 3 also illustrates that a subscription system may include an expert collective 314 comprising respective and distinct expert systems, namely an expert system 302, an expert system 304 and an expert system 306. Each of the expert systems may be dedicated to a specific vertical and provide a guided process for the creation of subscriptions and plans for customers in that vertical. For example, the expert system 302 may be dedicated to a cosmetics and beauty care vertical, the expert system 304 may be dedicated to a bicycle service vertical, and the expert system 306 may be dedicated to a car service vertical. Each of the expert systems within the expert collective 314 may furthermore be communicatively coupled, and have access, to a respective database 316.

Figure 4:
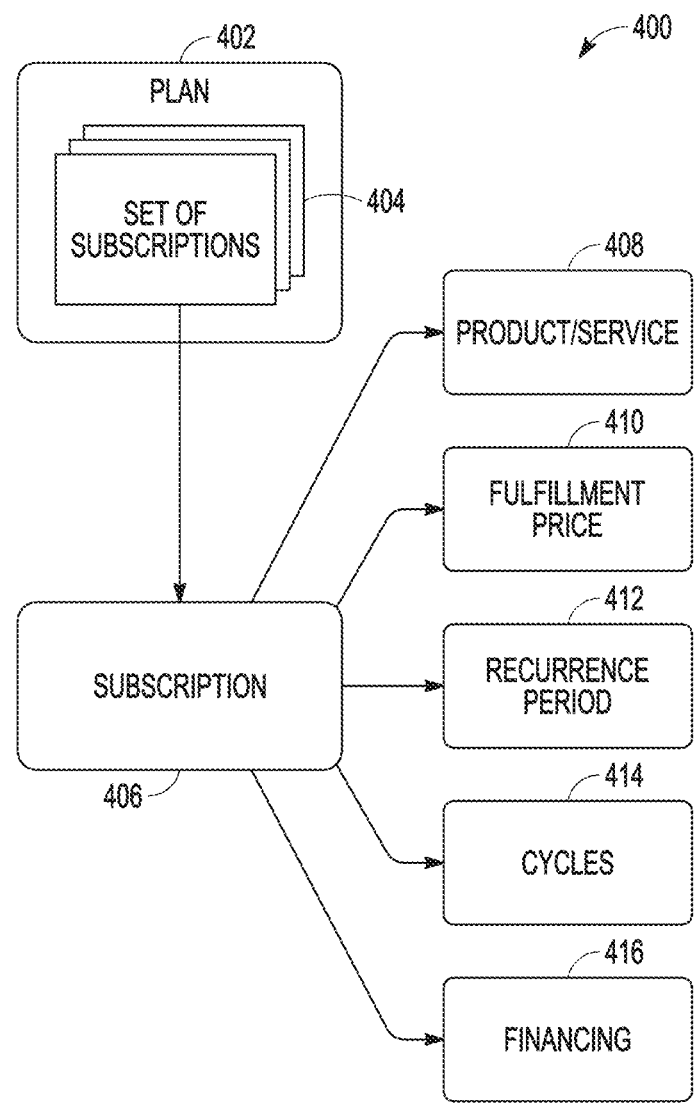
FIG. 4 is a diagrammatic representation of data structures maintained by a subscription service, according to some example embodiments.

FIG. 4 is a diagrammatic representation of a data architecture 400 created and maintained by the subscription engine 128. A plan 402 includes a set of subscriptions 404. Each subscription 406 of the set of subscriptions 404 is for a product or service and has several attributes, a subset of which is shown in FIG. 4. Specifically, each subscription 406 relates to a specific product/service 408, has a fulfillment price 410, and a recurrence period 412. With respect to the recurrence period 412, a subscription 406 has some time period after which the subscription 406 recurs, e.g., must again be fulfilled. A subscription 406 may furthermore have a specified number of cycles 414 and may occur indefinitely or terminate after the specified number of the cycles 414.

A subscription 406 furthermore has associated financing 416. A subscription 406 may be financed via a loan or via a service provider directly as part of the service provider's subscription business. Alternatively, a subscription 406 may be fulfilled at a time of ordering.

Attributes of the subscription 406 may be managed by customers in some cases. For example, the cycles 414 may be modified or changed by a customer using the client 112 in order to interact with the subscription engine 128.

A specific subscription 406 may furthermore be executed independently of any other subscriptions included in a set of subscriptions 404, with the exception that billing is aggregated to a single payment at predetermined intervals (e.g., once a month).

A plan 402 for the delivery of service may be constructed or defined with the help of an expert (e.g., a physician or doctor) using an appropriate expert system 302, and performance/delivery of a subscription 406 of the plan 402 may be fulfilled at the expert's place of business (e.g., the doctors practice). A plan 402 for the delivery of a product may be fulfilled by shipment from a third party.

To facilitate financing (e.g., a loan as part of the financing 416) in near real-time, the subscription engine 128 is communicatively coupled to financial exchange 130 to enable the subscription engine 128 digitally to communicate details about a particular subscription 406 or set of subscriptions 404 to the financial exchange 130. Financiers then access the financial exchange 130 (e.g., using a third-party application 116) to optionally accept a financing offer relating to a particular set of subscriptions 404 or subscription 406.

This facilitation of financing by a financier happens in near real-time as, in a typical scenario, a customer is physically present at the checkout counter of a service provider. To this end, the financial exchange 130 operationally aggregates accepted financing and rates, refusals, and regular recurring subscriptions amounts to create a quote for a total monthly price for all subscriptions within a set of subscriptions 404.

Figure 5:
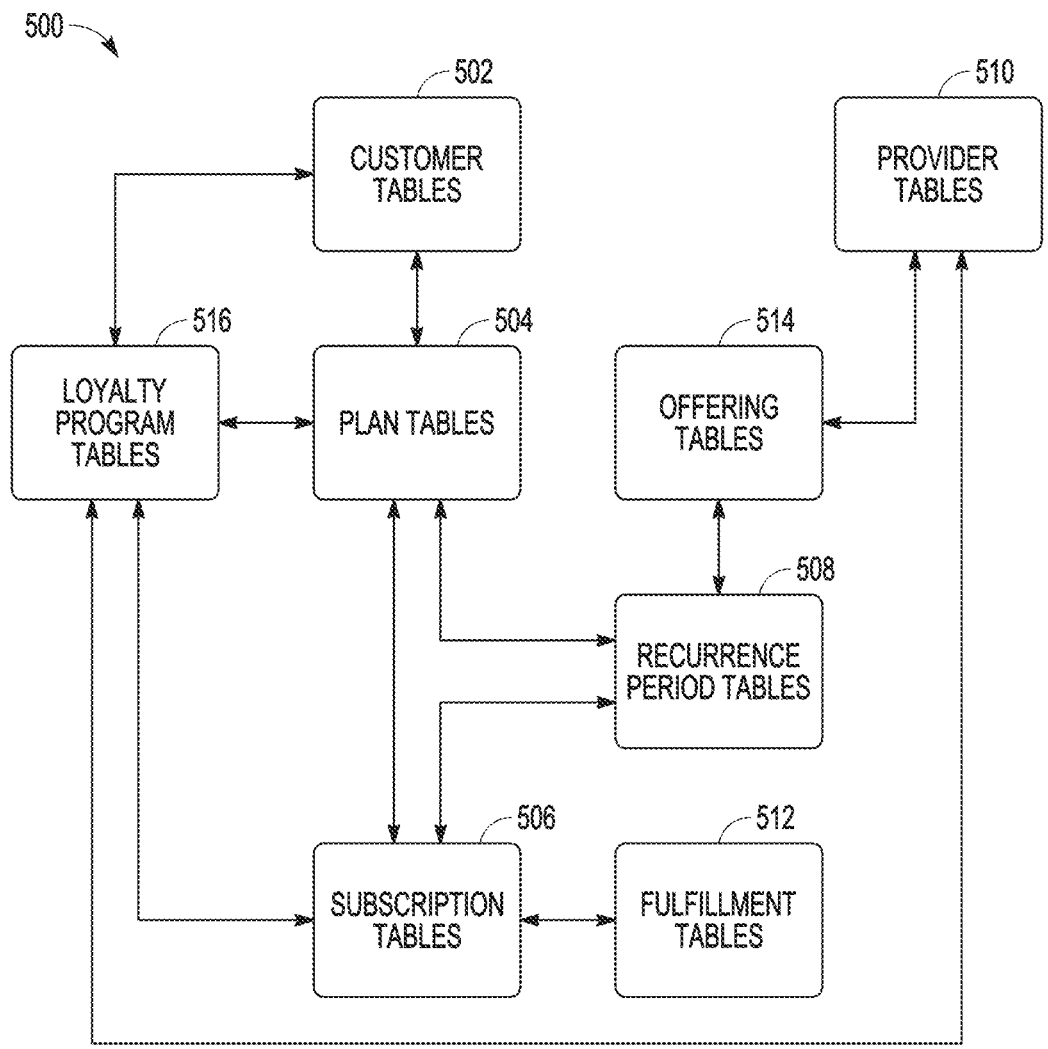
FIG. 5 is a block diagram of details regarding a data architecture, according to some example embodiments.

FIG. 5 is a block diagram illustrating a data architecture 500 according to some example embodiments. The data architecture 500 is realized and stored within the databases 132. Customer tables 502 store records for customers (e.g., consumer 134) of various service providers, each service provider, in turn, being recorded within provider tables 510. A customer record within the customer tables 502 may be associated with a plan 402 for which a record exists within plan tables 504. Each plan 402 within the plan tables 504 may be associated with a set of subscriptions 404, records for which exist within the subscription tables 506. Offering tables 514 maintain records for each product/service 408 (as examples of offerings), and each subscription 406 has a specified cycle 414 within recurrence period tables 508. A fulfillment price 410 associated with a particular subscription 406 is also stored within respective records of the recurrence period tables 508. Fulfillment records (e.g., indicating and recording whether a particular subscription 406 has been fulfilled) are stored within fulfillment tables 512. Loyalty program tables 514 store rules, parameters, and rewards relating to the operation of a multi-tenant loyalty program configuration platform and management of loyalty programs as discussed further herein.

Example aspects may include a reward. A reward is a corresponding action when a given rule is triggered (or set of rules that are triggered). In some examples, a loyalty program is a set of rules that triggers a reward. A loyalty program typically will require at least one rule, but very often is composed of several rules. In some examples, there is only one reward per program, even though that reward can be composed of many things (e.g. a 10% discount on top of a free product given).

Figure 6:
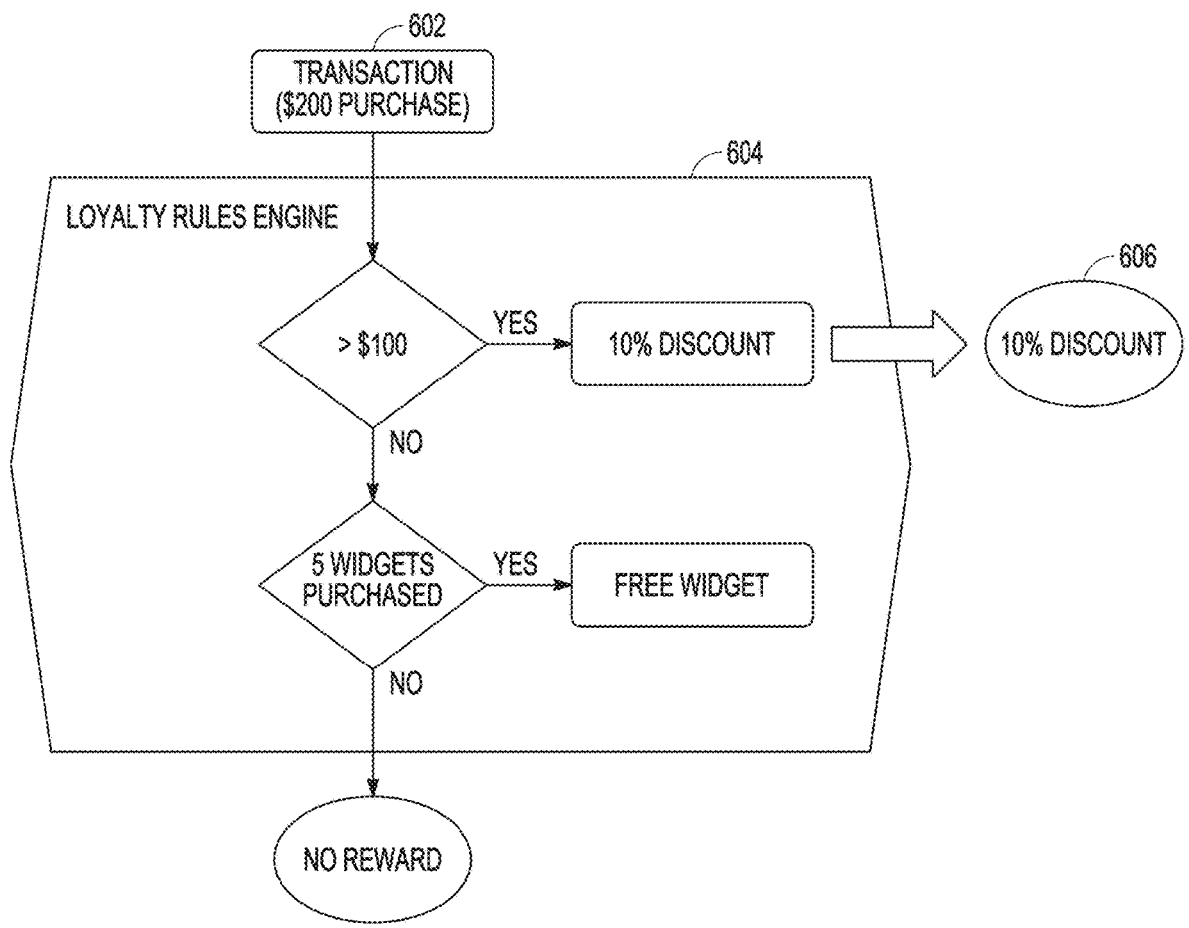
FIG. 6 is an example flow diagram of a rules engine, according to some example embodiments.

Consider two simple loyalty programs supported by present examples. In a loyalty program #1 (discount program), for every purchase that exceeds $100, a tenant (e.g. a practice) gives a 10% discount for the overall purchase price of a good or service. Here, the rule (or trigger) is a purchase amount greater than $100. The reward is a 10% discount. In a loyalty program #2 (e.g., product-based program with stamps), for every 5 widgets purchased (denoted by a product ID), the 6th widget is given for free. Here, the rule (or trigger) is 5 widgets purchased by the same customer since the activation date of the loyalty program (i.e., a "stamp" is accumulated for each widget purchased). The reward is a free widget. In the example flow diagram of a rules engine shown in FIG. 6, a transaction 602 with a purchase amount $200 is evaluated by a loyalty rules engine 604. Since the purchase amount satisfies the rule for the discount program (loyalty program #1), the 10% discount reward 606 is issued.

In some examples, for example loyalty program #1, a loyalty program is "stateless", meaning there are no previous transactions to evaluate in addition to the incoming transaction. There is no need to look up previous state information in order for the rule to be evaluated. On the other hand, loyalty program #2 does require stored previous state data. In this case, the stored data must represent how many widgets were purchased by the same customer in a previous transactions with the practice. This can be represented in many ways, such as keeping a collection of all the previous transactions made by the customer, or alternatively just by tracking a running tally of the "stamp" count, in which the stamp count is incremented upon each purchase of a widget. In some examples, a priority is established between loyalty programs so that only one loyalty program is triggered for any given transaction. For example, if the incoming transaction was both above $100 and included the fifth purchase of the widget, the rules engine must decide which reward to choose, but not both. If loyalty program #1 has higher priority, then only the discount would be applied.

Figure 7:
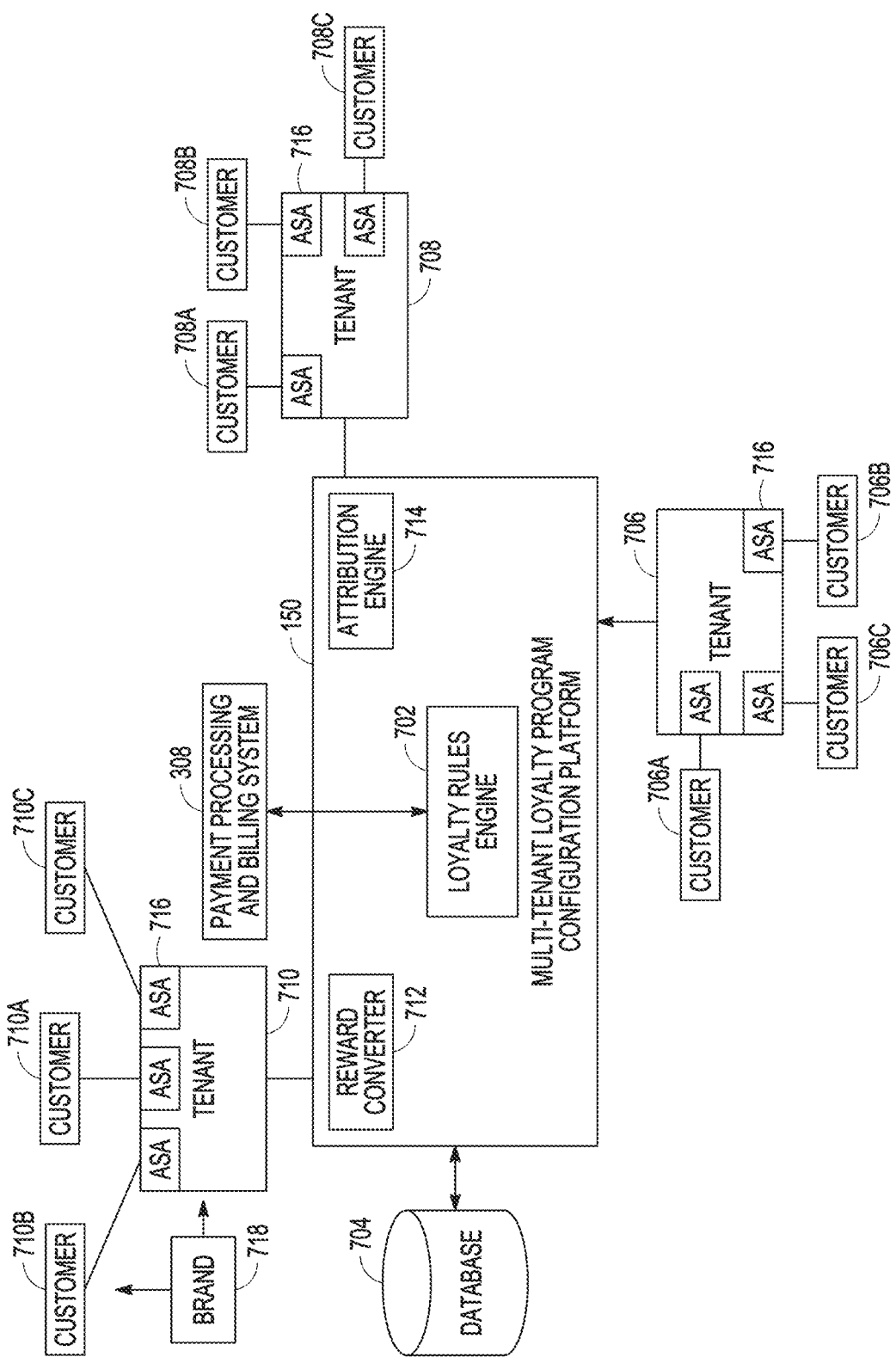
FIG. 7 illustrates further details regarding the subcomponents of a multi-tenant loyalty program configuration platform, according to some example embodiments.

FIG. 7 illustrates associated sub-components of a multi-tenant loyalty program configuration platform 150. In some examples, the platform 150 includes a loyalty rules engine 702 and a database 704. The multi-tenant loyalty program configuration platform 150 communicates with the payment processing and billing system 308 to process rewards for transactions. The platform further includes a reward converter 712 and an attribution engine 714. The loyalty rules engine 702, the reward converter 712, and the attribution engine 714 cooperate with each other to perform operations in configuring loyalty programs for each of the tenants 706, 708, and 710, and to manage the loyalty programs once they have been implemented.

The tenants 706, 708, and 710 each have customers labelled respectively as 706A-706C, 708A-708C, and 720A-710C in FIG. 7. In an example in which the tenants 706-710 include aesthetic medical practices, their respective customers 706A-710C will typically include patients as subscribing users.

Figure 13:
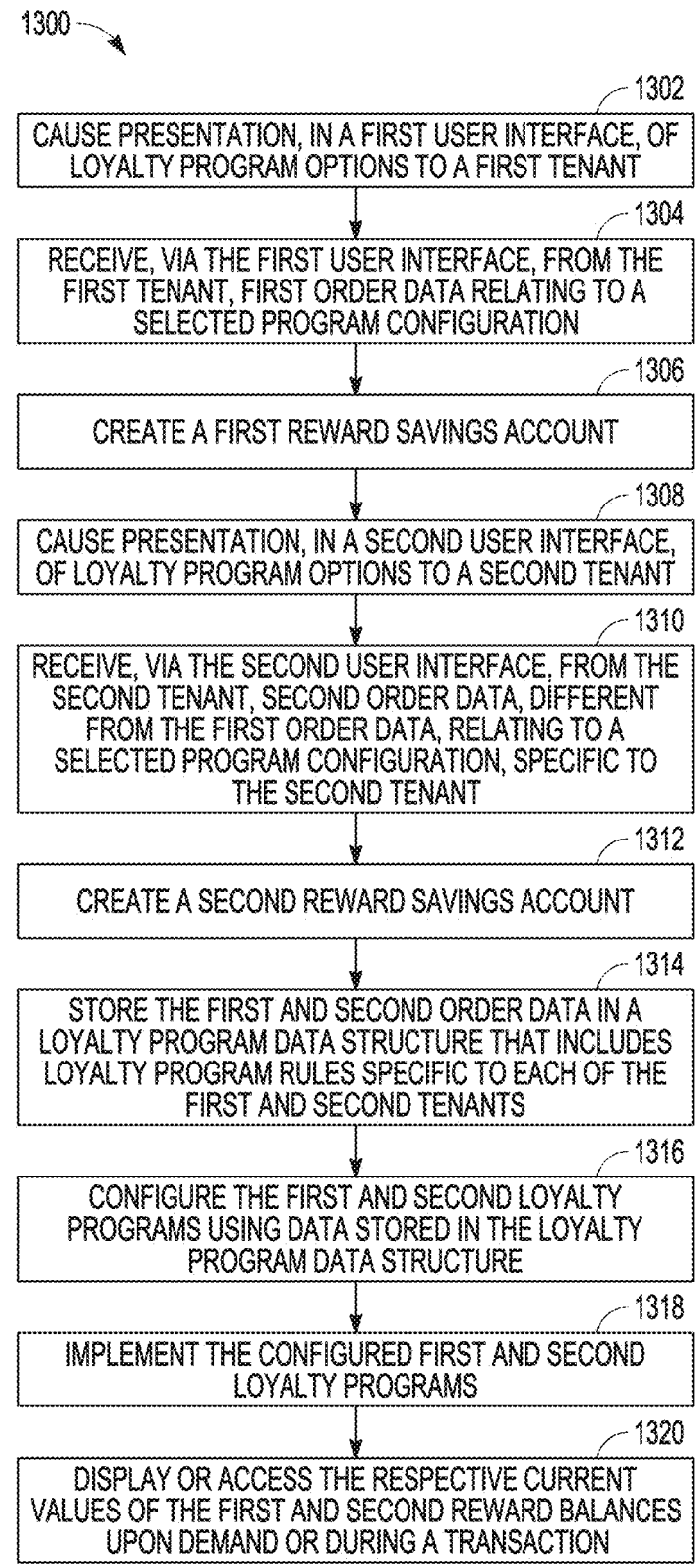
FIG. 13 is a flowchart showing operations in a method, according to some example embodiments.

With reference to FIG. 13, example operations performed by the multi-tenant loyalty program configuration platform 150 for selective configuration of loyalty programs in a multi-tenant environment may include, at operation 1302, causing presentation, in a first user interface, of loyalty program options to a first tenant 706 in the multi-tenant environment, the first user interface allowing the first tenant 706 and the multi-tenant loyalty program configuration platform 150 to collaborate in a program configuration flow on selected program options made by the first tenant 706.

At operation 1304, the multi-tenant loyalty program configuration platform 150 receives, via the first user interface, from the first tenant 706, first order data relating to a selected program configuration, specific to the first tenant 706, of a first loyalty program to be implemented using the first order data, the first order data including a first set of attributes relating to the first loyalty program. The set of attributes may include rules stored and processed by the loyalty rules engine 702.

At operation 1306, the multi-tenant loyalty program configuration platform 150 creates a first reward savings account, for example an ASA 716, specific to a first subscribed user 706A at the first tenant 706, for storing a current value of a first reward balance available to the first subscribed user 706A in the first loyalty program. An ASA 716 for each subscribed user (customer) 706A-710C may be hosted at each tenant 706-710 (as shown), or at the multi-tenant loyalty program configuration platform 150, or by a combination of both hosting arrangements.

At operation 1308, the multi-tenant loyalty program configuration platform 150 causes presentation, in a second user interface, of loyalty program options to a second tenant 708 in the multi-tenant environment, the second user interface allowing the second tenant 708 and the multi-tenant loyalty program configuration platform 150 to collaborate in a program configuration flow on selected program options made by the second tenant 708.

At operation 1310, the multi-tenant loyalty program configuration platform 150 receives, via the second user interface, from the second tenant 708, second order data, different from the first order data, relating to a selected program configuration, specific to the second tenant 708, of a second loyalty program to be implemented using the second order data, the second order data including a second set of attributes relating to the second loyalty program.

At operation 1312, the multi-tenant loyalty program configuration platform 150 creates a second reward savings account, for example another ASA 716, specific to a second subscribed user 708A at the second tenant 708, for storing a current value of a second reward balance available to the second subscribed user 780A in the second loyalty program.

At operation 1314, the multi-tenant loyalty program configuration platform 150 stores (for example in the database 704) the first and second order data in a loyalty program data structure that includes loyalty program rules specific to each of the first and second tenants 706 and 708 and the respective first and second loyalty programs, and respective current values of the first and second reward balances of the respective first and second rewards savings accounts (for example the respective ASAs 716).

At operation 1316, the multi-tenant loyalty program configuration platform 150 configures the first and second loyalty programs using data stored in the loyalty program data structure. At operation 1318, the multi-tenant loyalty program configuration platform 150 implements the configured first and second loyalty programs, and at operation 1320 displays or accesses the respective current values of the first and second reward balances upon demand or during a transaction by the first and second subscribed users 706A and 708A in the first and second loyalty programs.

In some examples, the reward converter 712 converts a configured reward in the first or second loyalty program into a reward currency or points, the reward currency or points being specific to the first or second tenant, and in response to an earned, redeemed, or issued reward, adjusts a current value of a first or second reward balance based on a converted reward currency. In some examples, the reward converter 712 adjusts a current value of a first or second reward balance based on a value of a redeemed reward.

In some examples of a closed loop configuration of a loyalty program, an earned or issued reward is redeemable only at the first or second tenant issuing the configured reward, or at which the configured reward was earned. In some examples, the earned or issued reward is issued by the first tenant 706 or the second tenant 710. In some examples, the earned or issued reward is issued by a third party 718, the third party including a manufacturer of a branded product or provider of a branded service, for example.

In some examples, the attribution engine 714 generates attribution data, the attribution data including an effect of an earned or issued reward on a key performance indicator (KPI) of the first tenant 706 or the second tenant 708.

In some examples, the multi-tenant loyalty program configuration platform 150 calculates an output of the implemented first or second loyalty program based on a user input during a checkout flow at the first or second tenant and causes presentation of the output as part of a checkout flow specific to the first tenant 706 or the second tenant 708.

In some examples, the output is rendered and presented as a reward for a purchase of a specific good or service offered by the respective first or second tenant.

In some examples, the multi-tenant loyalty program configuration platform 150 calculates a first output of the implemented first or second loyalty program, calculates a second output of the implemented first or second loyalty program, express the first and second outputs as respective first and second values based on a common reward currency or points applied to the implemented first or second loyalty program, compares the first and second values, and causes presentation to the first tenant 706 or second tenant 708 of a result based on the compared first and second values.

In some examples, the multi-tenant loyalty program configuration platform 150 automatically, or based on human input, reconfigures the first or second loyalty program based on the result.

In some examples, the first and second loyalty programs are configured asynchronously by the multi-tenant loyalty program platform, the asynchronous configuration based on receipt of the first and second order data at different times.

In some examples, the first and second tenants in the multi-tenant environment each offer respective goods or services using a commercial platform separate from the multi-tenant loyalty program configuration platform, and wherein a technical configuration or implementation of the commercial platform of the first tenant is different than a technical configuration or implementation of the commercial platform of the second tenant.

In some examples, the multi-tenant loyalty program configuration platform 150 causes presentation, in a third user interface, of loyalty program options to a third tenant 710 in the multi-tenant environment, the third user interface allowing the third tenant and the multi-tenant loyalty program configuration platform 150 to collaborate in a program configuration flow on selected program options made by the third tenant 710. The multi-tenant loyalty program configuration platform 150 receives, via the third user interface, from the third tenant 710, third order data relating to a selected program configuration, specific to the third tenant 710, of a third loyalty program to be implemented using the third order data, the third order data including a third set of attributes relating to the third loyalty program.

The multi-tenant loyalty program configuration platform 150 stores the third order data in the loyalty program data structure that includes loyalty program rules specific to each of the third tenant and the third loyalty program, and creates a third reward savings account (for example, another ASA 716), specific to a third subscribed user 710A at the first tenant, for storing a current value of a third reward balance available to the third subscribed user 710A in the third loyalty program.

The multi-tenant loyalty program configuration platform 150 configures the third loyalty program using data stored in the loyalty program data structure, implements the configured third loyalty program, and displays or accesses a current value of the third reward balance upon demand or during a transaction by the third subscribed user in the third loyalty program.

FIG. 8 is a table diagram illustrating a rules matrix providing further details of loyalty rules, according to some example embodiments, stored within the offering tables 514 in the database 704 and processed by the loyalty rules engine 702.

FIG. 9 is a table diagram illustrating further details of parameters, according to some example embodiments, stored within the offering tables 514 in the database 704 and processed by the rules engine 702.

FIG. 10 is a table diagram illustrating further details of reward definitions, according to some example embodiments, stored within the offering tables 514 and the database 704 and processed by the rules engine 702.

In some examples, if a tenant (for example a medical practice, or service provider) sets more than one reward in a unique loyalty program configured by the multi-tenant platform 150, those rewards will be available for a patient to choose from upon eligibility. In some examples, a patient can choose only one reward upon each redemption event. In some examples, an earn-by-product discount is only applied to a product, not a service. Example: a patient earns a stamp each time they receive more than 50 units of Botox. After 4 stamps, they receive a 10% discount off their Botox treatment. In some examples, an earn-by-amount-spent discount is applied to the entire purchase. Example: a patient earns a stamp each time they spend more than $400. After 4 stamps, they receive a 10% discount off their entire treatment. In some examples. An earn-by-category discount is only applied to the applicable category. Example: a patient earns a stamp each time they purchase any neurotoxin. After 4 stamps, they receive a 10% discount off any neurotoxin treatment.

In some examples, a multi-tenant loyalty program configuration platform operates in conjunction with or as part of a payment facilitator. As a result, there may be a number of vertical integrations that present themselves as opportunities in the context of creating and managing loyalty programs in a multitenant environment. In some examples, execution of a royalty program may be conducted in conjunction with execution of a payment transaction. Some examples enable individual tenants in the multitenant environment, for example medical practices, to configure and establish loyalty programs that are specific to that practice. In some examples, a tenant has the ability to create criteria for any given loyalty campaign and specify, for example, what earning criteria should be applied based on payments that may occur and then, based on that earning criteria, specify what rewards patients (also referred to as customers or users) can earn through different kinds of payment behaviors.

Examples of the present disclosure enable multi-tenant loyalty programs in a multi-tenant environment in which, for example, each tenant may have different computing systems, operating systems, using interfaces, checkout process flows, patient registration practices, and so forth. Notwithstanding these technical difficulties, an example multi-tenant loyalty program configuration platform of the present disclosure provides the ability to build, maintain, and configure a unique or customized loyalty program specific to a tenant's needs utilizing a common platform. Disclosed examples enable a tenant, such as a medical practice, to recognize consumption and/or payment behaviors of their patients and create and configure a loyalty program that will optimize the best revenue for that particular practice. In some examples, a multi-tenant loyalty program configuration platform includes a rules engine that operates with or sits on top of a payment processing system, such as the payment processing and billing system 308 of FIG. 3. Examples enable each of a large multiplicity of tenants, for example a group of medical practices operating as part of a common health care network, to apply a wide variety of earning and rewards rules that are specific to their own practices. Some examples include the presentation of user interfaces that include analytics dashboards to review the performance of any particular loyalty program at any point in time or over an extended period. Insights and learnings derived from these analytics may inform the creation of new loyalty programs, or the reconfiguration of existing loyalty programs in a multi-tenant environment.

In some examples, a multi-tenant loyalty program configuration platform creates a new loyalty program for a tenant. In other examples, the platform is able to onboard and handle existing loyalty programs that have previously been created or launched by the practices themselves. In some examples, loyalty programs are launched by external third-party distributors which may also be integrated into a multi-tenant loyalty program configuration platform. For example, a practice offering a Botox product may wish to launch a promotion or a loyalty program around that distribution, or a conglomerate of companies or practices may decide that they want to group themselves together into a particular loyalty coalition. Examples of a multi-tenant loyalty program configuration platform enable technical capability to support either of these situations. Other situations are possible.

In some examples, a multi-tenant loyalty program configuration platform is configurable and, in some examples, is agnostic to a specific type of loyalty program that may be created or operated by it. The multi-tenant loyalty program configuration platform can create a conglomerate or an affiliation of tenants each offering a different type of royalty program. The multi-tenant loyalty program configuration platform can ingest and accommodate different types of loyalty programs into a single platform. The technical capability and ease of use provided by a single platform may be used by each of a number of tenants to optimize practice revenues and so forth, and to bring in new patients and retain existing patients In some examples, a multi-tenant loyalty program configuration platform enables a comparison of the efficiency of one loyalty program versus another. Some examples normalize program efficiency (or performance) by using a common loyalty "currency" as an underlying marker or benchmark. In this way, the various outputs of a given loyalty program are normalized or homogenized to a base construct. Thus, a performance of a loyalty program based on a dollar spend can be compared with a loyalty program based on the purchase of a number of specific products or units, for example. In this manner, the multi-tenant loyalty program configuration platform, or a tenant, can configure a royalty program for maximum performance, accordingly.

Figure 11:
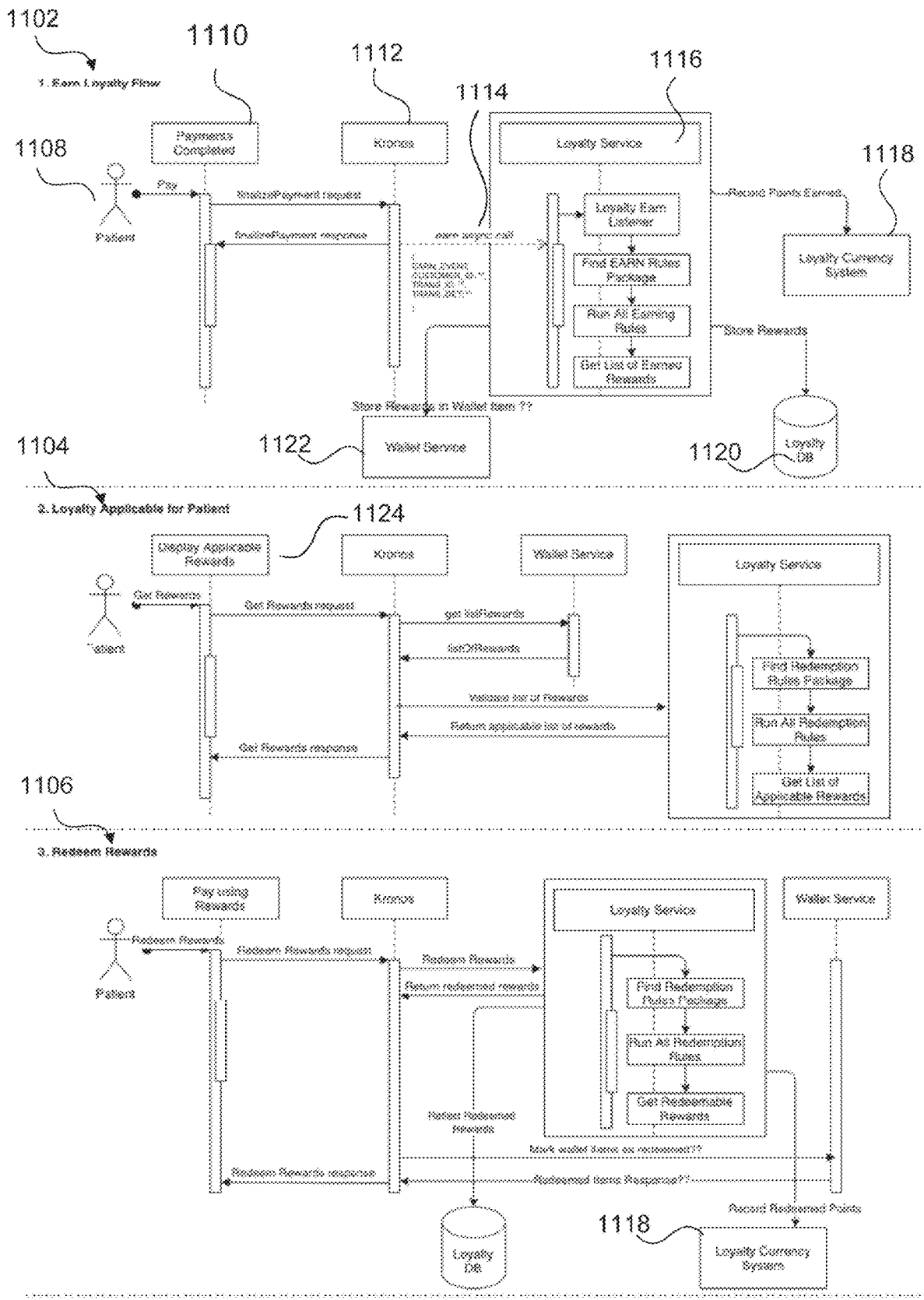
FIG. 11 is a flow diagram of example process flows and operations performed by a multi-tenant loyalty program configuration platform, according to some example embodiments.

FIG. 11 is a flow diagram of example process flows and operations performed by a multi-tenant loyalty program configuration platform 150, 216 and a loyalty rules engine 702. Some aspects of the process flows may occur at a runtime execution. In some examples, the runtime execution is layered on top of a financial transaction that is already in progress, for example payment of a product or service in an online checkout flow. In some examples, three main process flows are executed. A first flow 1102 includes an "earn loyalty" flow. A second flow 1104 includes a "loyalty applicable for patient" flow. A third flow 1106 includes a "redeem rewards" flow. In some examples, one or more of the process flows 1102, 1104, and 1106 are executed pursuant to the establishment of a loyalty program by a multi-tenant loyalty program configuration platform. A number of loyalty rules and rewards may have been configured, accordingly.

Referring again to FIG. 11, in an example earn loyalty flow 1102, a user 1108 (for example, a patient of a tenant such as a medical practice) purchases a product, for example, a cosmetic filler. A payment is completed at 1110. A finalized payment request is transmitted to a middleware layer 1112, referred to in the drawing as "Kronos" as an example of a proprietary middleware layer. The middleware layer may include a custom API gateway. Other middleware software is possible. An asynchronous message is sent at 1114 through a queue into a loyalty service 1116. The loyalty service 1116 may be hosted by a multi-tenant loyalty program configuration platform 150 (or 216), for example. The loyalty service 1116 includes a listener which is listening for this asynchronous message, and when it is received, the loyalty service 1116 is alerted to an earn event (the purchase event) being triggered. The loyalty service 1116 accesses the relevant transaction information of, say, X amount of dollars, to purchase a given product in this particular transaction.

At that point of time, the loyalty service 1116 pulls up, from the tables described above, all the applicable loyalty rules that correspond to this particular medical practice in the multi-tenant environment. The loyalty service 1116 commences executing these rules and, in some examples, generates a list of earned rewards and applies the applicable award to the specific transaction and medical practice.

In some examples, the earned rewards are converted into points, or a common currency, and the loyalty service 1116 stores this information in a loyalty currency system 1118. The points or common currency are applied to all loyalty programs in the multi-tenant environment, in some examples. In some examples, the rewards and points are stored in a local loyalty database 1120.

In some examples, the rewards and/or points are also transmitted to and stored in a wallet service 1122. The user 1108 may use the wallet service 1122 in a checkout flow to pay for products or services and have the stored rewards applied, accordingly. The wallet service 1122 may be hosted by the multi-tenant loyalty program configuration platform 150, or form part of the payment processing and billing system 308, for example.

Turning now to the "loyalty applicable for patient" flow 1104, the user 1108 returns to the medical practice for a subsequent treatment or purchase. The purchase may occur at the medical practice, or online. The wallet service 1122 retrieves the patient's rewards stored in the wallet service 1122 as wallet items, or in the loyalty database 1120, for example. In some instances, some of the rewards (wallet items) may not necessarily be applicable to the current purchase. For example, a reward may have been earned in relation to a prior purchase of a Botox product, whereas the current transaction pertains to a facial service for which no prior reward has been earned. Through a series of operations disclosed in the view, the wallet service 1122 interrogates the loyalty service 1116 and communicates information identifying the medical practice and type of transaction, and information pertaining to the current transaction. The wallet service 1122 seeks to determine whether other rewards may be redeemed. In other words, the wallet service 1122 seeks an identification, based on the stored rewards and/or the applicable loyalty rules, whether other rewards can be used on this transaction. A list of alternate rewards returned by the loyalty service 1116 may be displayed at 1124 to the user 1108 and redeemed accordingly.

The third process flow 1106 relates to an actual redemption of a reward. This reward may be a reward determined under the loyalty rules, or an alternate award of the type described just above. In this instance, the user 1108 in any event selects a reward for redemption. Through a series of operations described in the view, the purchase transaction is executed, and the available reward applied. In this case, a call made to the loyalty service 1116 to demarcate items (products and services) that have been consumed as part of this transaction as being redeemed under the loyalty program. This information is stored in the loyalty currency system 1118 and updated in the wallet service 1122 and/or stored in the loyalty database 1120.

In some examples, in relation to a multi-tenant loyalty program configuration platform, a user or customer is a tenant, such as a medical practice. In relation to the medical practice, a user or customer may be a patient. In some examples, patients can enroll in loyalty programs offered by one or more tenants, or the multi-tenant loyalty program configuration platform. A patient may earn rewards and redeem them under the loyalty rules. The loyalty rules may include different types of rules, such as earn rules and redemption rules. An earn rule may specify that if a total patient transaction amount is greater than $1,000, the patient receives 10% off on the present purchase, or a future purchase. A redemption rule, on the other hand, may limit the scope of a reward. For example, earning a Botox coupon as a reward might only be redeemed against a Botox purchase. In some examples, every reward earned is stored as loyalty earnings or points, as well as a wallet item. When these points are redeemed, they are marked as having been redeemed. FIGS. 8-10 are table diagrams illustrating further details of data used in the process flows just described, according to some example embodiments, and stored within the various tables discussed above with reference to FIG. 5.

Figure 12:
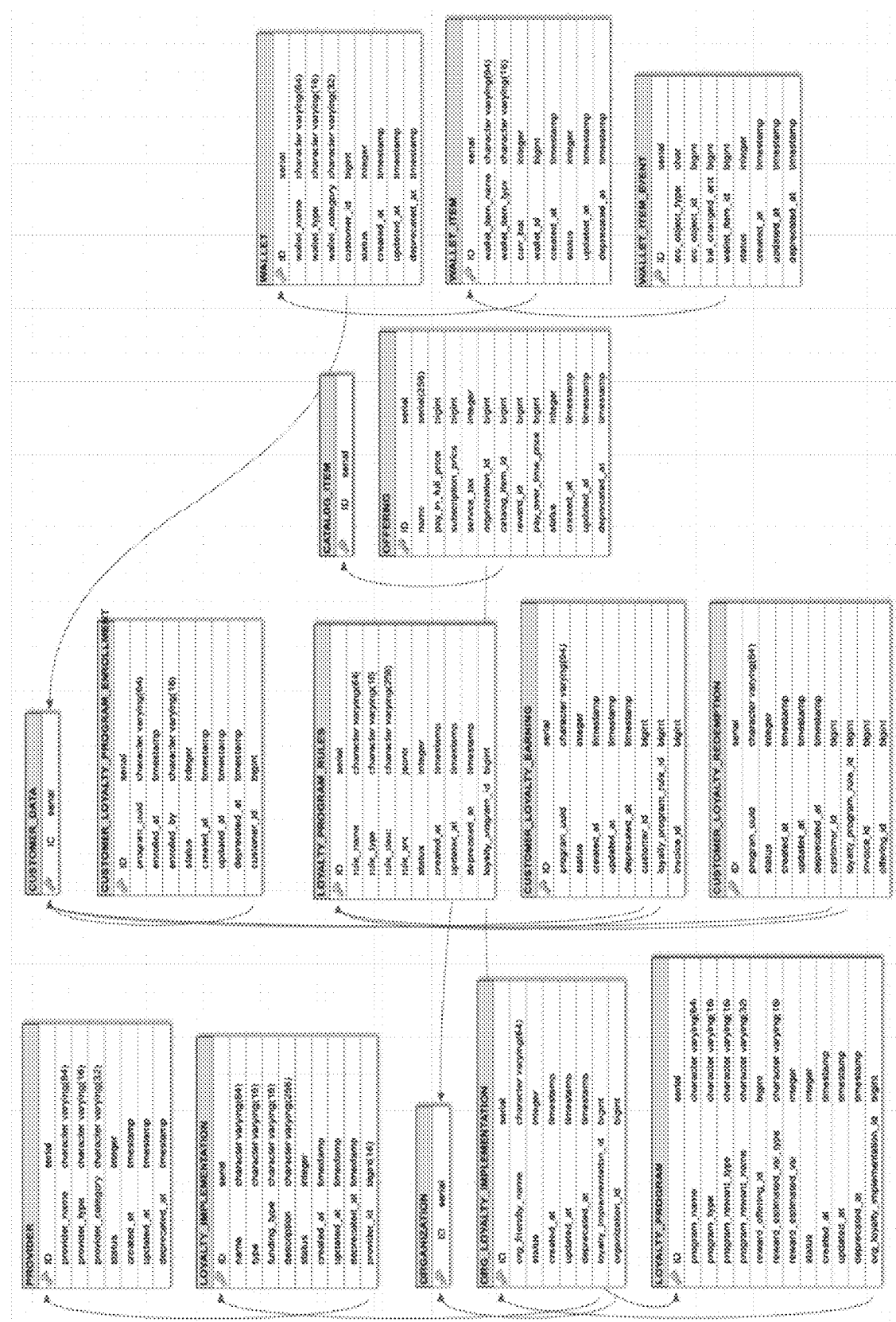
FIG. 12 is a table diagram illustrating further details of data, according to some example embodiments, stored within the various tables discussed above with reference to FIG. 5.

FIG. 12 is a table diagram illustrating further details of data, according to some example embodiments, stored within the various tables discussed above with reference to FIG. 5.

Figure 14:
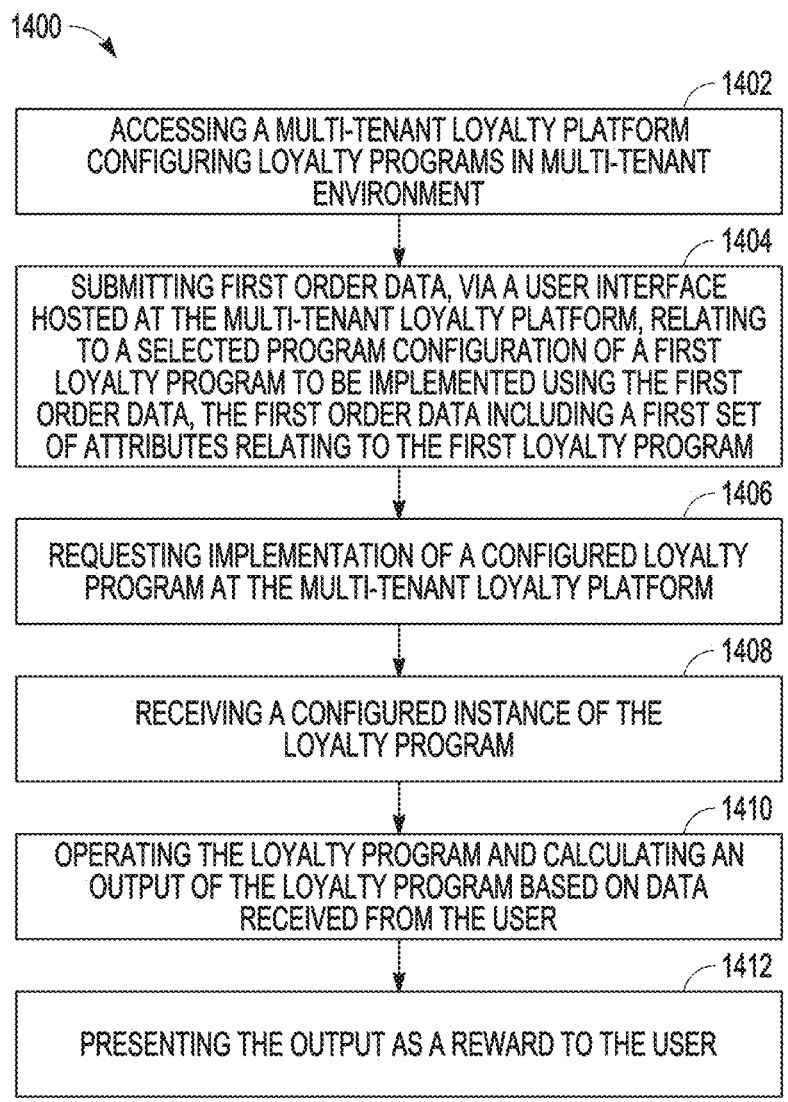
FIG. 14 is a flowchart showing operations in a method, according to some example embodiments.

FIG. 14 is a flowchart illustrating a method 1400, according to some example embodiments, of creating a reward for presentation to a user as part of a first loyalty program, the method including: at operation 1402, accessing a multi-tenant loyalty program configuration platform configuring loyalty programs in multi-tenant environment; at operation 1404, submitting first order data, via a user interface hosted at the multi-tenant loyalty program configuration platform, relating to a selected program configuration of a first loyalty program to be implemented using the first order data, the first order data including a first set of attributes relating to the first loyalty program; at operation 1406, requesting implementation of a configured loyalty program at the multi-tenant loyalty program configuration platform; at operation 1408, receiving a configured instance of the loyalty program; at operation 1410, operating the loyalty program and calculating an output of the loyalty program based on data received from the user; and at operation 1412 presenting the output as a reward to the user.

Figure 15:
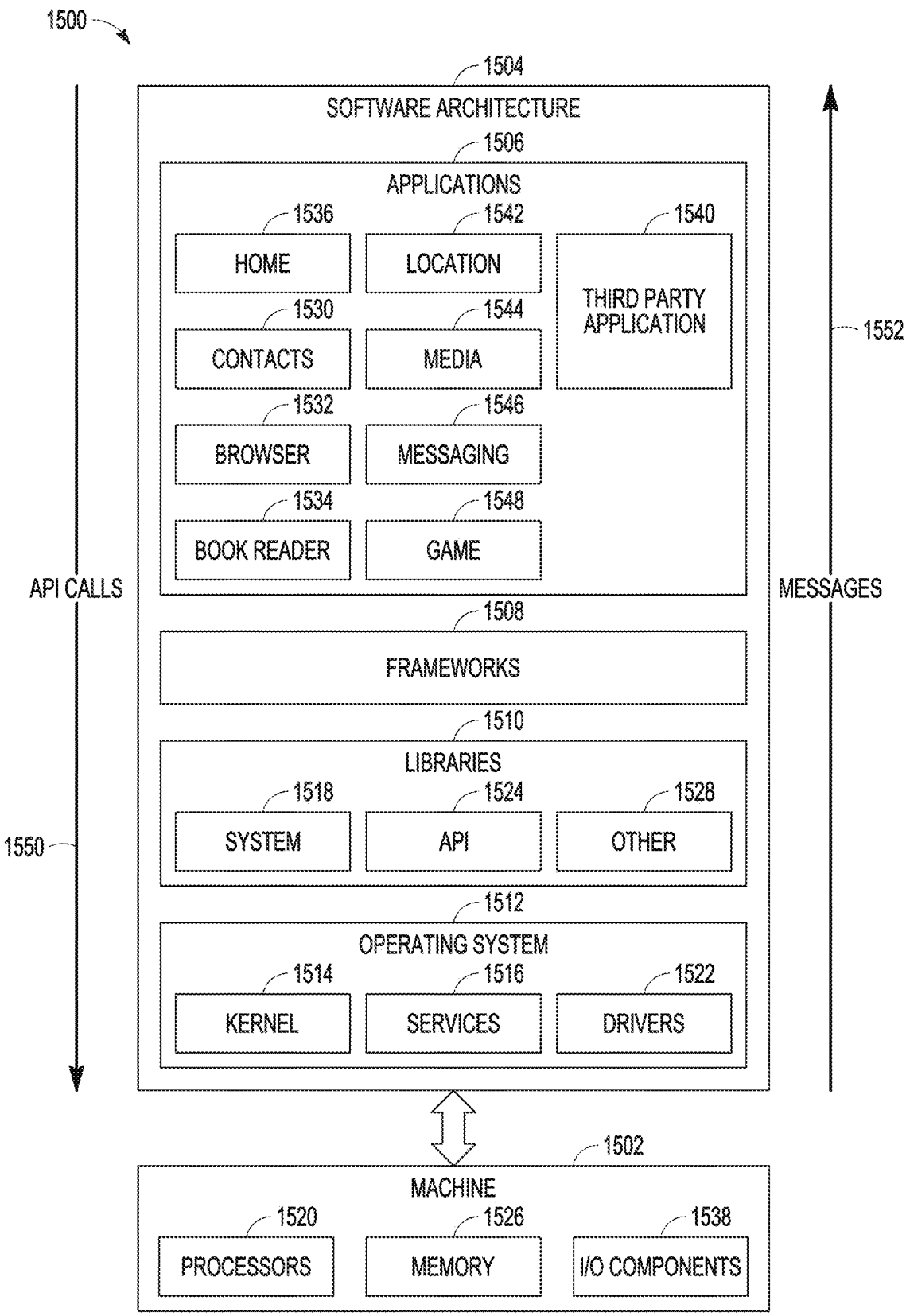
FIG. 15 illustrates a block diagram of a software architecture, according to some example embodiments.

FIG. 15 is a block diagram 1500 illustrating a software architecture 1504, which can be installed on any one or more of the devices herein. FIG. 15 is merely a non-limiting example of a software architecture, and it will be appreciated that many other architectures can be implemented to facilitate the functionality described herein. In various embodiments, the software architecture 1504 is implemented by hardware such as a machine 1502 of FIG. 15 that includes processors 1520, memory 1526, and I/O components 1538. In this example architecture, the software can be conceptualized as a stack of layers where each layer may provide particular functionality. For example, the software includes layers such as an operating system 1512, libraries 1510, frameworks 1508, and applications 1506. Operationally, the applications 1506 invoke application programming interface (API) calls 1550 through the software stack and receive messages 1552 in response to the API calls 1550, consistent with some embodiments.

In some examples, a non-transitory computer-readable storage medium is provided, the computer-readable storage medium including instructions that when executed by a computer, cause the computer to perform operations including at least those summarized above, or described elsewhere herein.

In various implementations, the operating system 1512 manages hardware resources and provides common services. The operating system 1512 includes, for example, a kernel 1514, services 1516, and drivers 1522. The kernel 1514 acts as an abstraction layer between the hardware and the other software layers, consistent with some embodiments. For example, the kernel 1514 provides memory management, processor management (e.g., scheduling), component management, networking, and security settings, among other functions. The services 1516 can provide other common services for the other software layers. The drivers 1522 are responsible for controlling or interfacing with the underlying hardware, according to some embodiments. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1510 provide a common low-level infrastructure utilized by the applications 1506. The libraries 1510 can include system libraries 1518 (e.g., C standard library) that can provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that can be utilized by the applications 1506, according to some embodiments. For example, the frameworks 1508 provide various graphical user interface (GUI) functions, high-level resource management, high-level location services, and so forth. The frameworks 1508 can provide a broad spectrum of other APIs that can be utilized by the applications 1506, some of which may be specific to a particular operating system or platform.

In an example embodiment, the applications 1506 include a home application 1536, a contacts application 1530, a browser application 1532, a book reader application 1534, a location application 1542, a media application 1544, a messaging application 1546, a game application 1548, and a broad assortment of other applications such as a third-party application 1540. According to some embodiments, the applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Figure 16:
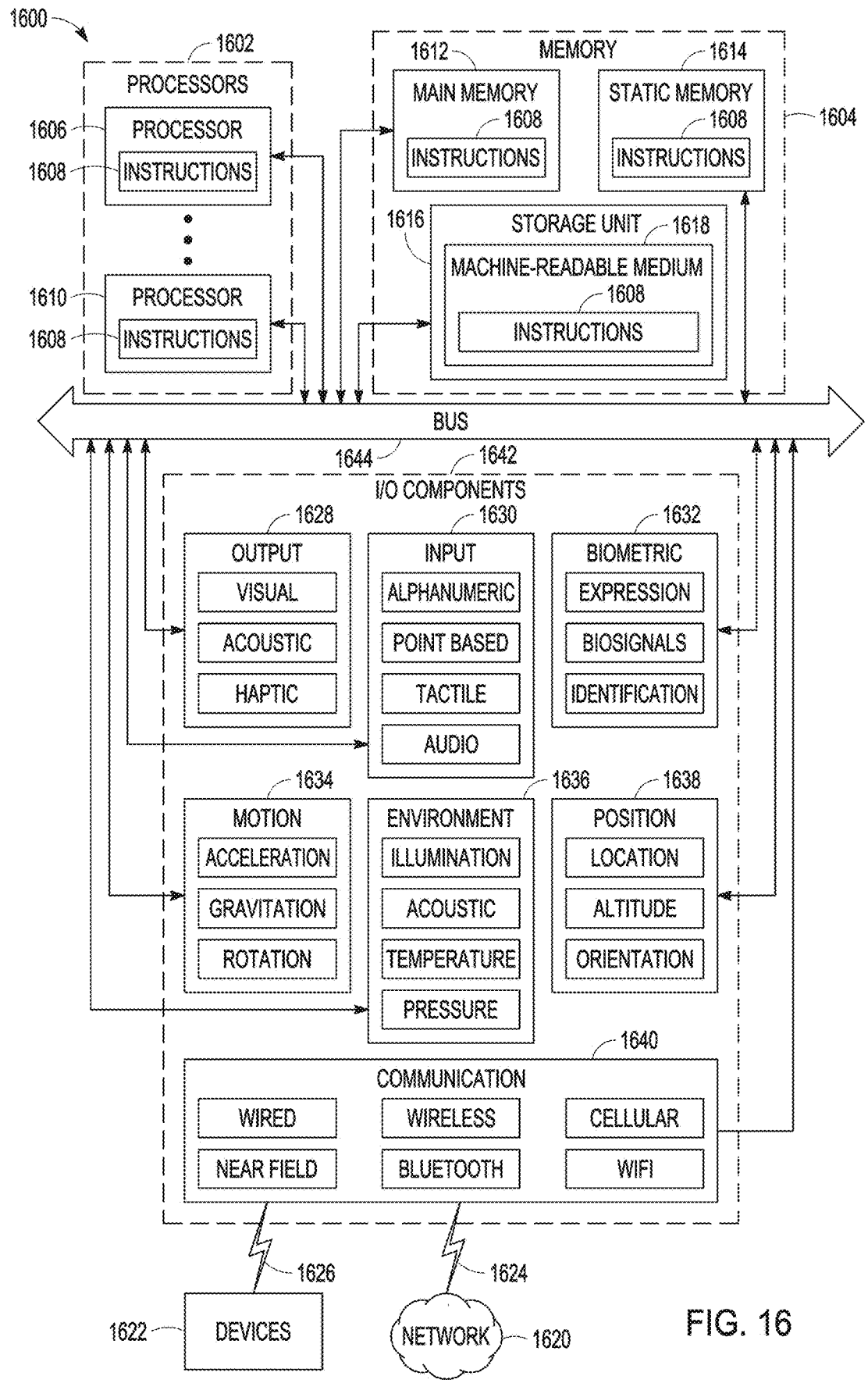
FIG. 16 illustrates a diagrammatic representation of a machine in the form of a computer system within which a set of instructions may be executed for causing the machine to perform any one or more of the methodologies discussed herein, according to an example embodiment.

FIG. 16 illustrates a diagrammatic representation of a machine 1600 in the form of a computer system within which a set of instructions may be executed for causing the machine to perform any one or more of the methodologies discussed herein, according to example embodiments. Specifically, FIG. 16 shows a diagrammatic representation of the machine 1600 in the example form of a computer system, within which instructions 1608 (e.g., software, a program, an application, an applet, an app, or other executable code) for causing the machine 1600 to perform any one or more of the methodologies discussed herein may be executed. The instructions 1608 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machine 1600 that individually or jointly execute the instructions 1608 to perform any one or more of the methodologies discussed herein.

The machine 1600 may include processors 1602, memory 1604, and I/O components 1642, which may be configured to communicate with each other such as via a bus 1644. In an example embodiment, the processors 1602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1606 and a processor 1610 that may execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single core, a single processor with multiple cores (e.g., a multi-core processor), multiple processors with a single core, multiple processors with multiples cores, or any combination thereof.

The memory 1604 may include a main memory 1612, a static memory 1614, and a storage unit 1616, both accessible to the processors 1602 such as via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602 (e.g., within the processor's cache memory), or any suitable combination thereof, during execution thereof by the machine 1600.

The I/O components 1642 may include a wide variety of components to receive input, provide output, produce output, transmit information, exchange information, capture measurements, and so on. The specific I/O components 1642 that are included in a particular machine will depend on the type of machine. For example, portable machines such as mobile phones will likely include a touch input device or other such input mechanisms, while a headless server machine will likely not include such a touch input device. It will be appreciated that the I/O components 1642 may include many other components that are not shown in FIG. 16. The I/O components 1642 are grouped according to functionality merely for simplifying the following discussion, and the grouping is in no way limiting. In various example embodiments, the U/O components 1642 may include output components 1628 and input components 1630. The output components 1628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1642 may include biometric components 1632, motion components 1634, environmental components 1636, or position components 1638, among a wide array of other components. For example, the biometric components 1632 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 may include acceleration sensor components (e.g., accelerometer), gravitation sensor components, rotation sensor components (e.g., gyroscope), and so forth. The environmental components 1636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1642 may include communication components 1640 operable to couple the machine 1600 to a network 1620 or devices 1622 via a coupling 1624 and a coupling 1626, respectively. For example, the communication components 1640 may include a network interface component or another suitable device to interface with the network 1620. In further examples, the communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1622 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional barcodes such as Universal Product Code (UPC) barcode, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 1604, main memory 1612, static memory 1614, and/or memory of the processors 1602) and/or storage unit 1616 may store one or more sets of instructions and data structures (e.g., software) embodying or utilized by any one or more of the methodologies or functions described herein. These instructions (e.g., the instructions 1608), when executed by processors 1602, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1620 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1620 or a portion of the network 1620 may include a wireless or cellular network, and the coupling 1624 may be a Code Division Multiple Access (CDMA) connection, a Global System for Mobile communications (GSM) connection, or another type of cellular or wireless coupling. In this example, the coupling 1624 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1608 may be transmitted or received over the network 1620 using a transmission medium via a network interface device (e.g., a network interface component included in the communication components 1640) and utilizing any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1608 for execution by the machine 1600, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A multi-tenant loyalty program configuration platform for selective configuration of loyalty programs in a multi-tenant environment, the platform comprising:

a processor; and an application program interface (API) server and/or a web server to facilitate access to the multi-tenant loyalty program configuration platform via an API gateway;

a loyalty service hosted by the multi-tenant loyalty program configuration platform, the loyalty service including a listener to listen for asynchronous loyalty program configuration messages received via the API gateway;

a memory storing instructions which, when executed by the processor, configure the multi-tenant loyalty program configuration platform to:

cause presentation, in a first user interface, of loyalty program options to a first tenant in the multi-tenant environment, the first user interface allowing the first tenant and the multi-tenant loyalty program configuration platform to collaborate in a program configuration flow on selected program options made by the first tenant;

receive, via the first user interface, from the first tenant, first order data relating to a selected program configuration, specific to the first tenant, of a first loyalty program to be implemented using the first order data, the first order data including a first set of attributes relating to the first loyalty program;

create a first reward savings account, specific to a first subscribed user at the first tenant, for storing a current value of a first reward balance available to the first subscribed user in the first loyalty program;

cause presentation, in a second user interface, of loyalty program options to a second tenant in the multi-tenant environment, the second user interface allowing the second tenant and the multi-tenant loyalty program configuration platform to collaborate in a program configuration flow on selected program options made by the second tenant;

receive, via the second user interface, from the second tenant, second order data, different from the first order data, relating to a selected program configuration, specific to the second tenant, of a second loyalty program to be implemented using the second order data, the second order data including a second set of attributes relating to the second loyalty program;

create a second reward savings account, specific to a second subscribed user at the second tenant, for storing a current value of a second reward balance available to the second subscribed user in the second loyalty program;

store the first and second order data in a loyalty program data structure that includes loyalty program rules specific to each of the first and second tenants and the respective first and second loyalty programs, and respective current values of the first and second reward balances of the respective first and second rewards savings accounts;

configure the first and second loyalty programs using data stored in the loyalty program data structure, wherein the first and second loyalty programs are configured asynchronously by the multi-tenant loyalty program platform, the asynchronous configuration of the first and second loyalty programs based on a receipt by the listener of the first and second order data at different times via the API gateway;

implement the configured first and second loyalty programs;

display or access the respective current values of the first and second reward balances upon demand or during a transaction by the first and second subscribed users in the first and second loyalty programs;
convert a configured reward in the first or second loyalty program into a reward currency or points, the reward currency or points being specific to the first or second tenant; and
in response to an earned, redeemed, or issued reward triggered by a purchase event detected in a queue of asynchronous messages at the loyalty service, adjust a current value of a first or second reward balance based on a converted reward currency.

2. The multi-tenant loyalty program configuration platform of claim 1, wherein an earned or issued reward is redeemable only at the first or second tenant issuing the configured reward, or at which the configured reward was earned.

3. The multi-tenant loyalty program configuration platform of claim 1, wherein the processor is further configured to:
adjust a current value of a first or second reward balance based on a value of a redeemed reward.

4. The multi-tenant loyalty program configuration platform of claim 1, wherein the earned or issued reward is issued by the first or second tenant.

5. The multi-tenant loyalty program configuration platform of claim 1, wherein the earned or issued reward is issued by a third party, the third party including a manufacturer of a branded product or provider of a branded service.

6. The multi-tenant loyalty program configuration platform of claim 1, wherein the processor is further configured to:
generate attribution data, the attribution data including an effect of an earned or issued reward on a key performance indicator of the first or second tenant.

7. The multi-tenant loyalty program configuration platform of claim 1, wherein the processor is further configured to:
calculate an output of the implemented first or second loyalty program based on a user input during a checkout flow at the first or second tenant; and
cause presentation of the output as part of a checkout flow specific to the first tenant or the second tenant.

8. The multi-tenant loyalty program configuration platform of claim 7, wherein the output is rendered and presented as a reward for a purchase of a specific good or service offered by the respective first or second tenant.

9. The multi-tenant loyalty program configuration platform of claim 1, wherein the processor is further configured to:
calculate a first output of the implemented first or second loyalty program;
calculate a second output of the implemented first or second loyalty program;
express the first and second outputs as respective first and second values based on a common reward currency or points applied to the implemented first or second loyalty program;
compare the first and second values; and
cause presentation to the first or second tenant of a result based on the compared first and second values.

10. The multi-tenant loyalty program configuration platform of claim 9, wherein the processor is further configured to reconfigure the first or second loyalty program based on the result.

11. The multi-tenant loyalty program configuration platform of claim 1, wherein the first and second tenants in the multi-tenant environment each offer respective goods or services using a commercial platform separate from the multi-tenant loyalty program configuration platform, and wherein a technical configuration or implementation of the commercial platform of the first tenant is different than a technical configuration or implementation of the commercial platform of the second tenant.

12. The multi-tenant loyalty program configuration platform of claim 1, wherein the processor is further configured to:
cause presentation, in a third user interface, of loyalty program options to a third tenant in the multi-tenant environment, the user interface allowing the third tenant and the multi-tenant loyalty program configuration platform to collaborate in a program configuration flow on selected program options made by the third tenant;
receive, via the third user interface, from the third tenant, third order data relating to a selected program configuration, specific to the third tenant, of a third loyalty program to be implemented using the third order data, the third order data including a third set of attributes relating to the third loyalty program;
store the third order data in the loyalty program data structure that includes loyalty program rules specific to each of the third tenant and the third loyalty program;
create a third reward savings account, specific to a third subscribed user at the first tenant, for storing a current value of a third reward balance available to the third subscribed user in the third loyalty program;
configure the third loyalty program using data stored in the loyalty program data structure;
implement the configured third loyalty program; and
display or access a current value of the third reward balance upon demand or during a transaction by the third subscribed user in the third loyalty program.

13. A method, at a multi-tenant loyalty program configuration platform, of configuring a loyalty program in a multi-tenant environment, the method comprising:
causing presentation, in a first user interface, of loyalty program options to a first tenant in the multi-tenant environment, the user interface allowing the first tenant and a multi-tenant loyalty program configuration platform to collaborate in a program configuration flow on selected program options made by the first tenant;
receiving, via the first user interface, from the first tenant, first order data relating to a selected program configuration, specific to the first tenant, of a first loyalty program to be implemented using the first order data, the first order data including a first set of attributes relating to the first loyalty program;
creating a first reward savings account, specific to a first subscribed user at the first tenant, for storing a current value of a first reward balance available to the first subscribed user in the first loyalty program;
causing presentation, in a second user interface, of loyalty program options to a second tenant in the multi-tenant environment, the user interface allowing the second tenant and the multi-tenant loyalty program configuration platform to collaborate in a program configuration flow on selected program options made by the second tenant;
receiving, via the second user interface, from the second tenant, second order data, different from the first order data, relating to a selected program configuration, specific to the second tenant, of a second loyalty program to be implemented using the second order data, the second order data including a second set of attributes relating to the second loyalty program;

creating a second reward savings account, specific to a second subscribed user at the second tenant, for storing a current value of a second reward balance available to the second subscribed user in the second loyalty program;

storing the first and second order data in a loyalty program data structure that includes loyalty program rules specific to each of the first and second tenants and the respective first and second loyalty programs, and respective current values of the first and second reward balances of the respective first and second rewards savings accounts;

configuring the first and second loyalty programs using data stored in the loyalty program data structure, wherein the first and second loyalty programs are configured asynchronously by the multi-tenant loyalty program platform, the asynchronous configuration of the first and second loyalty programs based on a receipt by a listener of the first and second order data at different times via an API gateway of an API or web server facilitating access to the multi-tenant loyalty program configuration platform via the API gateway;

implementing the configured first and second loyalty programs;

displaying or accessing the respective current values of the first and second reward balances upon demand or during a transaction by the first and second subscribed users in the first and second loyalty programs;

converting a configured reward in the first or second loyalty program into a reward currency or points, the reward currency or points being specific to the first or second tenant; and in response to an earned, redeemed, or issued reward triggered by a purchase event detected in a queue of asynchronous messages at the loyalty service, adjusting a current value of a first or second reward balance based on a converted reward currency.

14. The method of claim 13, wherein an earned or issued reward is redeemable only at the first or second tenant issuing the configured reward, or at which the configured reward was earned.

15. The method of claim 13, further comprising:
adjusting a current value of a first or second reward balance based on a value of a redeemed reward.

16. A non-transitory computer-readable storage medium, the computer-readable storage medium including instructions that when executed by a computer, cause the computer to perform operations including:

causing presentation, in a first user interface, of loyalty program options to a first tenant in the multi-tenant environment, the user interface allowing the first tenant and a multi-tenant loyalty program configuration platform to collaborate in a program configuration flow on selected program options made by the first tenant;

receiving, via the first user interface, from the first tenant, first order data relating to a selected program configuration, specific to the first tenant, of a first loyalty program to be implemented using the first order data, the first order data including a first set of attributes relating to the first loyalty program;

creating a first reward savings account, specific to a first subscribed user at the first tenant, for storing a current value of a first reward balance available to the first subscribed user in the first loyalty program;

causing presentation, in a second user interface, of loyalty program options to a second tenant in the multi-tenant environment, the user interface allowing the second tenant and the multi-tenant loyalty program configuration platform to collaborate in a program configuration flow on selected program options made by the second tenant;

receiving, via the second user interface, from the second tenant, second order data, different from the first order data, relating to a selected program configuration, specific to the second tenant, of a second loyalty program to be implemented using the second order data, the second order data including a second set of attributes relating to the second loyalty program;

creating a second reward savings account, specific to a second subscribed user at the second tenant, for storing a current value of a second reward balance available to the second subscribed user in the second loyalty program;

storing the first and second order data in a loyalty program data structure that includes loyalty program rules specific to each of the first and second tenants and the respective first and second loyalty programs, and respective current values of the first and second reward balances of the respective first and second rewards savings accounts;

configuring the first and second loyalty programs using data stored in the loyalty program data structure, wherein the first and second loyalty programs are configured asynchronously a multi-tenant loyalty program platform, the asynchronous configuration of the first and second loyalty programs based on a receipt by a listener of the first and second order data at different times via an API gateway of an API or web server facilitating access to the multi-tenant loyalty program configuration platform via the API gateway;

implementing the configured first and second loyalty programs;

displaying or accessing the respective current values of the first and second reward balances upon demand or during a transaction by the first and second subscribed users in the first and second loyalty programs;

converting a configured reward in the first or second loyalty program into a reward currency or points, the reward currency or points being specific to the first or second tenant; and in response to an earned, redeemed, or issued reward triggered by a purchase event detected in a queue of asynchronous messages at the loyalty service, adjusting a current value of a first or second reward balance based on a converted reward currency.

* * * * *

UNITED STATES PATENT AND TRADEMARK OFFICE
CERTIFICATE OF CORRECTION

| | | |
|---|---|---|
| PATENT NO. | : 11,682,033 B1 | |
| APPLICATION NO. | : 17/981036 | |
| DATED | : June 20, 2023 | |
| INVENTOR(S) | : Hahr et al. | |

It is certified that error appears in the above-identified patent and that said Letters Patent is hereby corrected as shown below:

In the Drawings

On sheet 1 of 16, Fig. 1, and on the title page, the illustrative print figure, reference numeral 10, delete "10" and insert --100-- therefor On sheet 1 of 16, Fig. 1, and on the title page, the illustrative print figure, reference numeral 104 (Second Occurrence), delete "104" and insert --118-- therefor On sheet 3 of 16, Fig. 3, reference numeral 324, delete "324" and insert --314-- therefor In the Specification In Column 11, Line 23, delete "514" and insert --516-- therefor In Column 12, Lines 21-22, delete "720A-710C" and insert --710A-710C-- therefor In Column 13, Line 9, delete "780A" and insert --708A-- therefor In Column 13, Line 43, delete "710." and insert --708.-- therefor In Column 21, Line 21, delete "U/O" and insert --I/O-- therefor Signed and Sealed this
Fifth Day of September, 2023

Katherine Kelly Vidal
*Director of the United States Patent and Trademark Office*